(12) United States Patent
Fisher, Jr.

(10) Patent No.: US 6,462,507 B2
(45) Date of Patent: Oct. 8, 2002

(54) APPARATUS AND METHOD FOR INITIAL CHARGING, SELF-STARTING, AND OPERATION OF A POWER SUPPLY WITH AN INTERMITTENT AND/OR VARIABLE ENERGY SOURCE AND A RECHARGEABLE ENERGY STORAGE DEVICE

(75) Inventor: Carl Fisher, Jr., Berthoud, CO (US)

(73) Assignee: OKC Products, Inc., Longmont, CO (US)

( * ) Notice: Subject to any disclaimer, the term of this patent is extended or adjusted under 35 U.S.C. 154(b) by 42 days.

(21) Appl. No.: 09/793,206

(22) Filed: Feb. 26, 2001

(65) Prior Publication Data
US 2001/0043050 A1 Nov. 22, 2001

Related U.S. Application Data

(63) Continuation-in-part of application No. 09/131,254, filed on Aug. 7, 1998, now Pat. No. 6,194,793.

(51) Int. Cl.[7] .................................................. H02J 7/00
(52) U.S. Cl. .......................................... 320/101; 307/66
(58) Field of Search ................................. 320/101, 139, 320/141, 145; 323/266, 268; 307/66, 43, 46

(56) References Cited

U.S. PATENT DOCUMENTS 6,081,104 A * 1/2000 Kern ........................... 320/101
6,194,793 B1 * 2/2001 Fisher, Jr. ..................... 307/66

OTHER PUBLICATIONS

"Single–Cell solar 5–V Supply," *Electronic Design*, pp. 90 and 92 (Apr. 15, 1996).
"TPS2014, TPS2015 Power Distribution Switches," *Texas Instruments*, pp. 1–24 (Dec. 1996).
"TPS7101Q, TPS7133Q, PTS7148Q,TPS7150Q LowDropout Voltage Regulators," *Texas Instruments*, pp. 1–32 (Nov. 1994).
"5V/3.3V/3V/Adjustable–Output, Step–Up/Step–Down DC–DC Converters," *MAXIM Integrated Products*, pp. 1–12, with "MAX877 Evaluation Kit," pp. 1–4 attached (May 1994).
"LP2950/LP2950AC/LP2950C 5V and LP2951/LP2951AC/LP2951C Adjustable Micropower Voltage Regulators," *National Semiconductor Corporation*, pp. 1–16 (May 1989).

* cited by examiner

Primary Examiner—Edward H. Tso
Assistant Examiner—Lawrence Luk
(74) Attorney, Agent, or Firm—Faegre & Benson; James R. Young

(57) ABSTRACT

A power supply for supplying energy to a load includes an energy supply source for generating energy, an energy storage device that is charged from the energy generated by the energy supply source, an optional regulator for improving the energy matching of the energy supply source and the energy storage device, an energy converter for delivering energy from the energy storage device and/or the energy supply source to a load, a detector for monitoring the energy level of the energy storage device and for determining when to activate the energy converter to allow energy delivery to the load from the energy storage device and/or the energy supply source, an optional energy discharge controller that allows the energy storage device to discharge over time, and an optional switch controller for controlling a switch, valve, relay, etc.

32 Claims, 8 Drawing Sheets

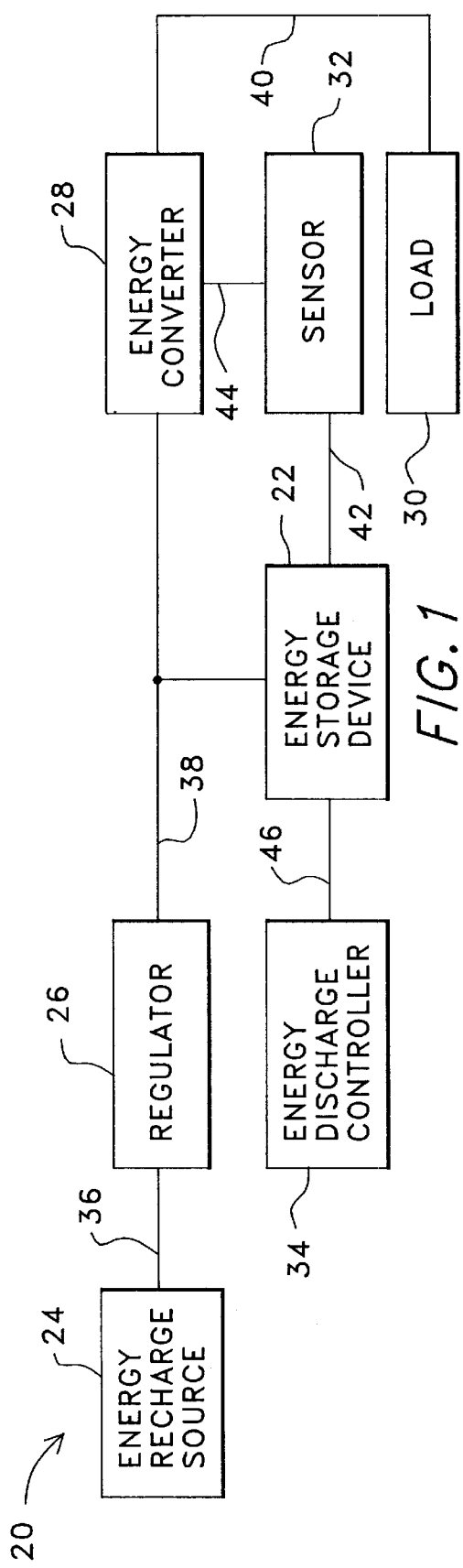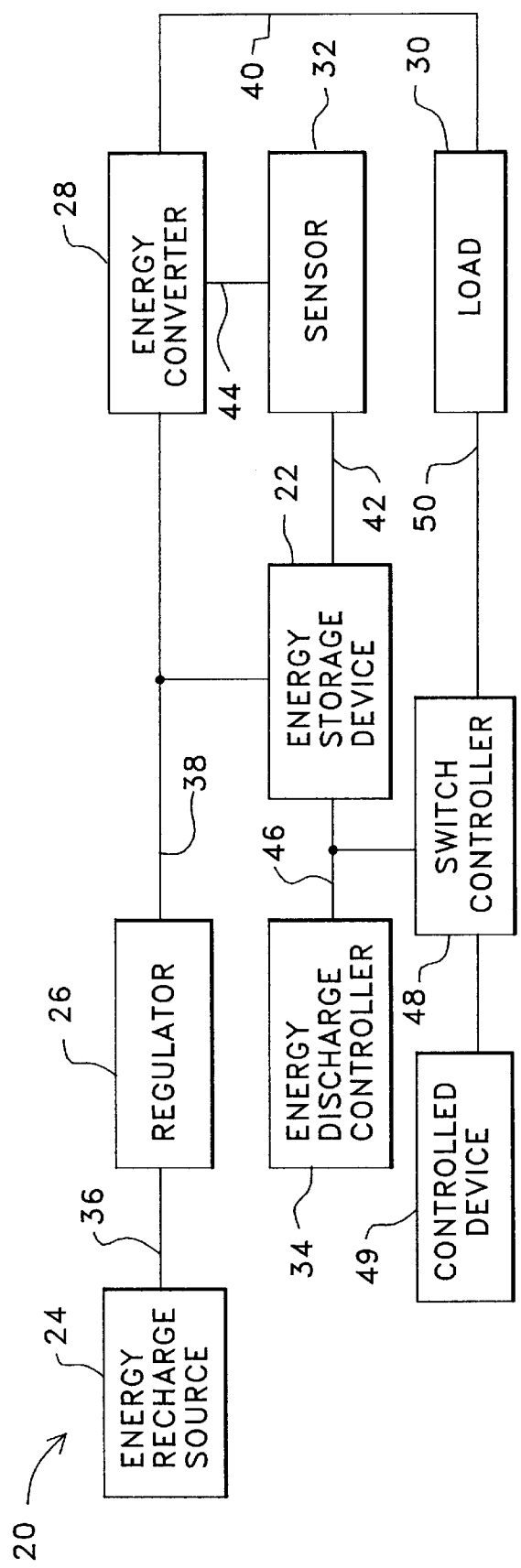

APPARATUS AND METHOD FOR INITIAL CHARGING, SELF-STARTING, AND OPERATION OF A POWER SUPPLY WITH AN INTERMITTENT AND/OR VARIABLE ENERGY SOURCE AND A RECHARGEABLE ENERGY STORAGE DEVICE

RELATED APPLICATIONS

This application is a continuation-in-part of U.S. patent application Ser. No. 09/131,254, filed Aug. 7, 1998, and entitled "Apparatus and Method for Charging an Energy Storage Source", now U.S. Pat. No. 6,194,793, issued Feb. 27, 2001, which is incorporated herein by reference.

BACKGROUND OF THE INVENTION

1. Field of the Invention

The present invention relates generally to a electric power supples and, more specifically, to a power supply with a small and very limited capacity power source and with a small and very limited power storage capacity for powering electrical devices that require intermittent, momentary, high current pulses.

2. Description of the Prior Art

The recent availability of more reliable small, self-contained, renewable power sources, such as rechargeable batteries, solar cells, and the like have contributed to the advent of small, portable electronic products, equipment, controller, and other devices that can be located and operated independent from conventional public utility electric power grids, or other large capacity power sources. The issue of initial start-up of power supplies for small or portable electronic devices from dead or discharged rechargeable battery conditions is not so much of an issue, when chargers or re-chargers for such electronic devices can simply be plugged into public utility electric power grids or other large power sources. However, when faced with situations in which plugging into such a large power source for re-charging is inconvenient, unavailable, or simply not wanted, especially in combination with a desire or an economic necessity of making such portable electronic products, equipment, controllers, or other devices as small and efficient as possible, available options for such small, efficient, and dependable power supplies become quite limited.

The power supply described in co-pending U.S. patent application, Ser. No. 09/131,254 (now issued U.S. Pat. No. 6,194,793), which is incorporated herein by reference, is especially useful for powering a load, such as a microprocessor or other electric circuit, that requires a constant voltage, such as 5.0 volts, with a low capacity, sometimes lower voltage, and sometimes intermittent power source, such as a solar cell, small capacity battery, thermal electric generator, or the like. That power supply combines a low capacity or intermittent power source, power storage device, a power converter for converting either lower or higher voltage power to a steady output voltage, and a control feature, which prevents the power converter from operating until the voltage in the power storage device is high enough for the power converter to operate at a minimum efficiency level to facilitate from a dead or low storage charge state using only the low capacity or intermittent source power. It also includes an embodiment in which a secondary load, such as a solenoid, can be powered from the energy storage device, but only when the voltage in the energy storage device is built up high enough to not only operate the power converter efficiently for powering the microprocessor controller circuit, but also high enough to operate the solenoid.

A primary advantage of the power supply circuit of that Ser. No. 09/131,254 (now U.S. Pat. No. 6,194,793) is that it eliminated the need for plugging into public utility electric grid or large electric generator to start and operate a load and made it feasible to use and rely on only a low-voltage, rechargeable battery and a low-capacity, even intermittent, power source, such as a solar cell, for a self-starting, efficient, and reliable power supply. Consequently, it provided a smaller, less expensive, and more reliable power source than was available before.

However, when that power supply of U.S. patent application, Ser. No. 09/131,254 (now U.S. Pat. No. 6,194, 793) is also used to power an intermittent or periodic, high-current load or pulse, such as when it is operating a solenoid, transmitting a burst of data by radio frequency (RF) or micro waves, making a motor controlled adjustment, operating an alarm, or the like, the marginal capacity of that power supply is limited, and it can become unreliable. For example, if the storage device is a rechargeable battery, which is not sufficiently recharged when called upon to power such a high-current load, or which is exposed to cold weather in which its power capacity is substantially diminished, it may not be able to provide sufficient power, even for short bursts, for reliable operation. Of course, a larger battery with more capacity and a higher working voltage could improve reliability, but it would sacrifice physical size, weight, and cost advantages of the smaller battery.

SUMMARY OF THE INVENTION

Accordingly, it is the general object of the present invention to provide a more reliable apparatus and method for powering high current switching or high current, short pulse operation of electrical devices with small energy source and energy storage components.

Another general object of the present invention is to provide an apparatus and a method for improving the efficiency of electrical energy delivery to an intermittent, short, but high current, load from a small, limited capacity, battery storage device.

Still another general object of the present invention is to provide an apparatus and a method for enabling initial "dead" battery charging and power start-up of low-powered instrumentation or equipment to operate controlled, intermittent, short, but high current, loads along with more constant powered control components.

A more specific object of this invention is to improve high current switching capabilities and reliability of the power supply described in co-pending U.S. patent application, Ser. No. 09/131,254 (now issued U.S. Pat. No. 6,194,793), which is incorporated herein by reference.

Another specific object of this invention is to improve reliability and performance of the power supply described in U.S. patent application, Ser. No. 09/1331,254 (now U.S. Pat. No. 6,194,793) in initial dead battery start-up or in other dead or very low battery situations in applications where the power supply is used to power a high current switching or other intermittent, high current functions.

Still another specific object of this invention is to provide improvements in the power supply circuit of U.S. patent application, Ser. No. 09/131,254 (now U.S. Pat. No. 6,194, 793) that extend the ability to power reliable, high current switching and other intermittent, high current pulse loads to use even smaller capacity and lower voltage power storage devices and power sources.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and described herein for enabling example, but not for limitation, a power supply in accordance with the present invention may include a combination of an energy storage capacitor and associated switch and control components for discharging energy in intermittent, short, pulses from the energy storage capacitor to power a controlled device with a rechargeable energy storage device, and energy converter that provides energy from the energy storage device to the energy storage capacitor and to the associated switch and control components at a constant voltage, but only when the voltage of the rechargeable energy storage device is high enough for the energy converter to operate at a minimum threshold efficiency level. An energy recharge source provides electric energy to charge and maintain electric energy in the rechargeable energy storage device. The constant voltage energy from the energy converter can be provided directly to the energy storage capacitor, or it can be routed through a current limiting resistor or through a logic controller, depending on the application and on reliability issues associated with the application.

To further achieve the foregoing and other objects, the present invention further comprises a method of converting energy from a rechargeable energy storage device to a constant voltage output to an energy storage capacitor and associated switching and control components, but only when voltage of the rechargeable energy storage device is high enough for the energy converter to operate at a minimum threshold efficiency level, and discharging energy from the energy storage capacitor in short, intermittent pulses, to power a controlled device. The invention can also include recharging the rechargeable energy storage device with electric energy from a small capacity energy recharge source, such as a solar cell or panel, battery, thermal electric generator, wind powered generator, or the like. The constant voltage electric energy from the energy converter can be fed directly to the energy storage capacitor and to the associated switching and control components in parallel, or it can be fed through, and controlled by, control components to the energy storage capacitor.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings:

FIG. 1 is a functional block diagram of the power supply of the present invention configured to provide constant voltage power to a load, such as a microprocessor, logic controller, or other device that requires a fairly steady voltage and small current draw;

FIG. 2 is a functional block diagram of a second embodiment of the power supply of the present invention and illustrates the addition of a switch controller to the power supply of FIG. 1 in which a high current, switch controlled device is powered directly by the energy recharge source and energy storage device while switch control signals are provided by a logic controller powered by the constant voltage power output of the power supply;

FIG. 8 is a data print-out showing example characteristics of the power supply and high current switching apparatus when a solenoid valve controlled device is turned on.

DETAILED DESCRIPTION OF THE PREFERRED EMBODIMENTS

Figure 3:
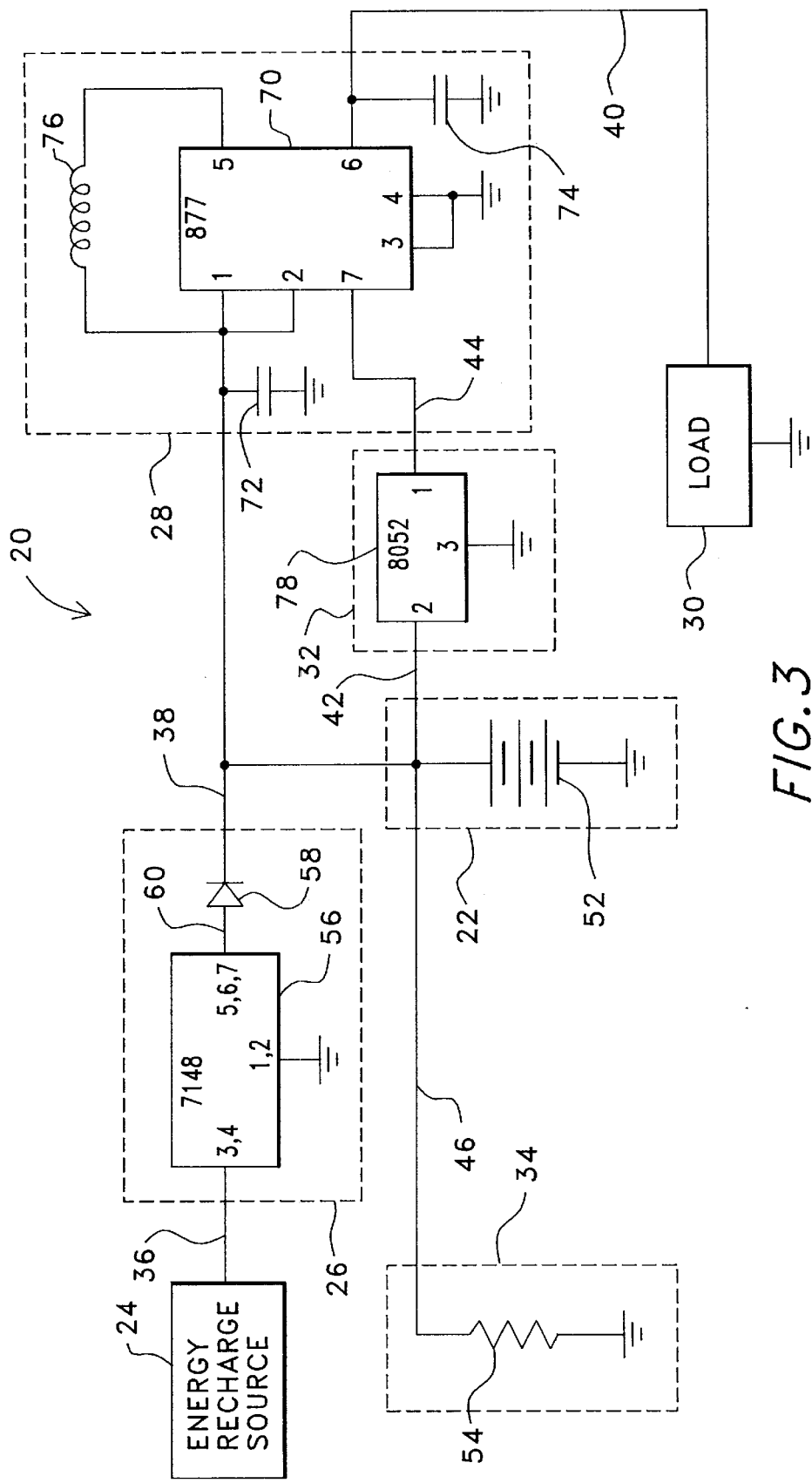
FIG. 3 is an exemplary schematic diagram of the power supply of FIG. 1.

A power supply 20 in accordance with the present invention is illustrated in FIG. 1 and includes an energy storage device 22, which is charged and recharged with source power or energy generated by an energy recharge or supply source 24. An optional regulator 26 improves the matching of the energy recharge source 24 to the energy storage device 22 and reduces overcharging of the energy storage device 22. An energy converter 28, when activated, delivers power or energy from the energy storage device 22 and/or from the energy recharge source 24 to a load 30 at a constant output voltage, regardless of whether the voltage of the energy storage device 22 is higher or lower than such constant voltage. A voltage sensor or detector 32 monitors the voltage level of energy stored in the energy storage device 22 and determines when to activate the energy converter 28 to allow power or energy delivery to the load 30 from the energy storage device 22 and/or the energy recharge source 24 based on whether the voltage of the energy storage device 22 is high enough to operate the energy converter 28 at a minimum desired efficiency so that inefficient operation of the energy converter 28 cannot draw more energy than the energy storage device 22 and the energy recharge source 24 are able to provide. An optional energy discharge controller 34 allows the energy storage device 22 to discharge or drain its stored energy over time during extended periods of inactivity or non use of the power supply 20, which extends the useful life of typical rechargeable batteries that may be used in the energy storage device 22.

A significant advantage of the power supply 20 of this invention is that it allows energy to be delivered to the load 30 from the energy storage device 22 and/or the energy recharge source 24 while also allowing the energy recharge source 24 to provide source energy, when available, to the energy storage device 22 so as to build up and increase the amount of energy stored in the energy storage device 22. Another significant advantage of the power supply 20 of the present invention is that it improves the efficiency of energy delivery to the load 30 while reducing the likelihood or propensity for premature failure of the energy storage device 22. Still another significant advantage of the power supply 20 of this invention is that it prevents energy delivery to the load 30 when the energy storage device 22 is in a discharged or low charge condition so that all of the energy generated by the energy recharge source 24 is supplied or made available to the energy storage device 22 until the voltage of the energy storage device 22 builds up to a minimum voltage threshold level at which the energy converter 28 will operate at a minimum desired energy conversion efficiency level. This feature allows the energy recharge source 24 to build up the amount of energy in the energy storage device 22 first and then to deliver and maintain delivery of energy to the load 30 as well as to continue building up and maintaining energy in the storage energy device 22 during periods when the energy recharge source 24 is producing enough energy to do so.

The energy storage device 22 may be any kind of power or energy storage device such as, for example, a battery, a battery pack, a capacitor, a capacitor bank, power cell, etc. For purposes of the present invention, the energy storage device 22 is preferably rechargeable, such as one or more rechargeable batteries, so that the power or energy expended or supplied by the energy storage device 22 to a load can be replenished.

The energy supply or recharge source 24 may be any kind of power or energy producing device or system such as, for example, a solar cell, solar panel, solar array, wind turbine, hydroelectric generator, transformer, power or electric grid, magnetic generator, thermal electric generator, etc. The power supply 20 is particularly well suited for applications or in situations where electrical power or energy cannot easily or economically be supplied to the load 30 from public utility electric power grids or other large electric power sources.

The load 30 can be any kind of electric load, which requires electric power at a rate or magnitude that does not exceed the capacities of the energy storage device 22 and the electric recharge source over time, or for which periods of nonuse during shortages of such capacities can be tolerated before the power supply 20 is re-energized and self-starts, as explained below. The power supply 20 embodiments illustrated in FIGS. 1–4 are suitable for loads 30 that have either fairly steady or intermittent current requirements that are within the capabilities of the energy storage device 22 to provide in voltage ranges within which the energy storage device 22 operates. For example, if the load 30 is a microprocessor or other logic controller that operates at a steady voltage matched to the output voltage of the energy converter 28 on node 40, for example, 5.0 volts, with a fairly steady, or at least not excessive, current draw, for example, about 2.5 mA, the power supply 20 shown in FIGS. 1 and 3 could power such a load quite effectively and reliably utilizing a nominal 3.6 volt rechargeable battery pack with 600 mA-Hr capacity rating for the energy storage device 22 and a solar panel with a 55 mA short circuit and 5.5 V open circuit rating. With such load 30 that draws a fairly steady current, the energy recharge source 24 can normally provide enough energy to keep the energy storage source 22 charged while it is powering the load 30. However, the energy storage source 22 has enough stored energy capacity to power the load 30 for some periods of time during which the energy recharge source 24 is incapable of doing so—for example, during the dark of night or during cloudy weather when the energy recharge source 24 is a solar panel. The shut-down and self-starting capability of this invention from dead or very low charge condition of the energy storage source 22, as will be explained in more detail below, is utilized in circumstances when the combined capacities of the energy storage device 22 and energy recharge source 24 are insufficient over time to keep up with the power demands of the load 30—such as, during prolonged periods of cloudy weather, if the energy recharge source 24 is a solar panel, or when there is too long a period of time before recharge or replacement, if the energy recharge source 26 is a battery.

Figure 4:
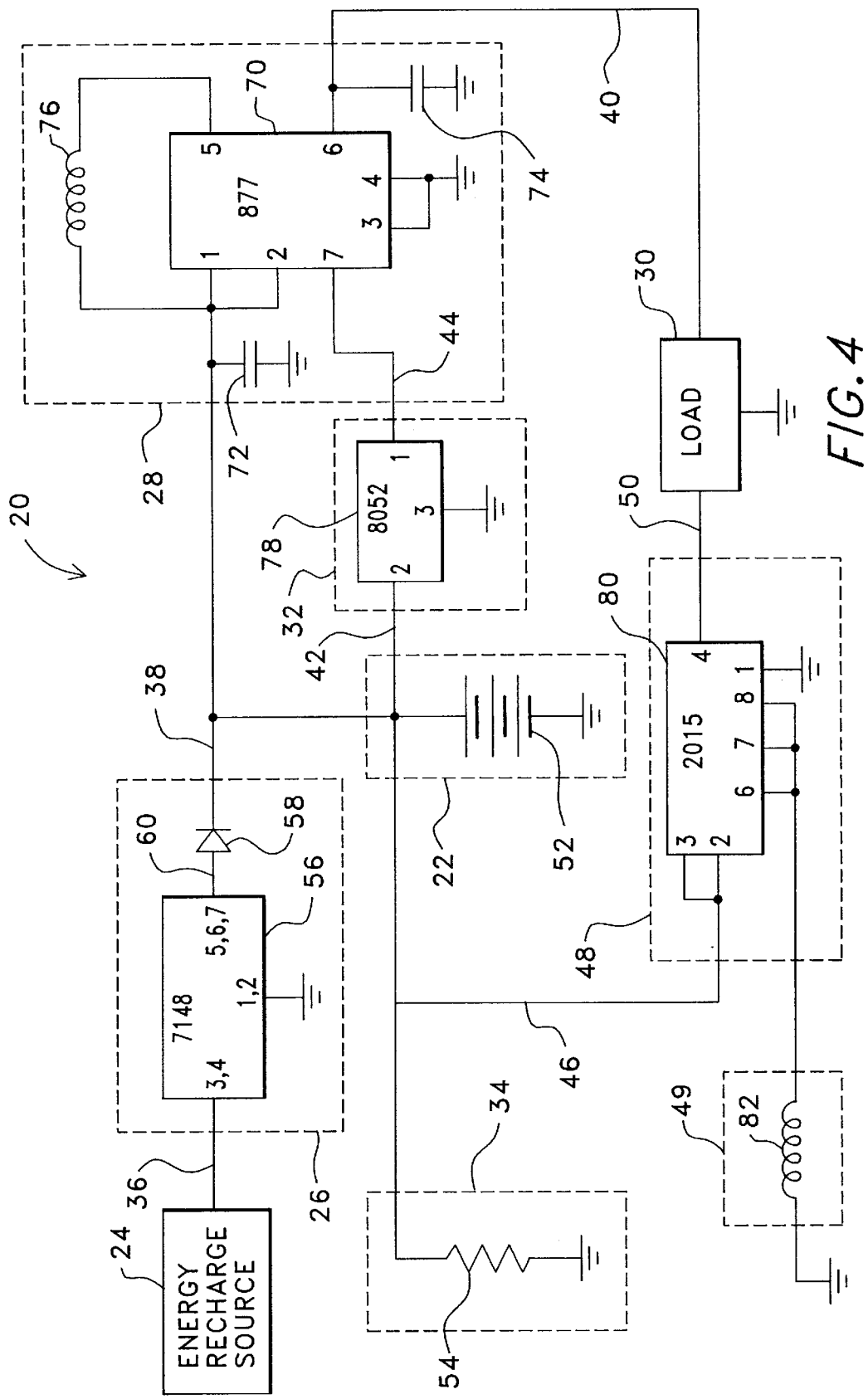
FIG. 4 is an exemplary schematic diagram of the power supply, including the switch controlled device, of FIG. 2.

In FIGS. 2 and 4, the power source 20 is shown in an embodiment that is configured to also power an, intermittent, momentary, high current load or pulse represented as a controlled device 49, such as a solenoid, relay, radio frequency or microwave transmitter, alarm, or some other function. In the embodiment of FIGS. 2 and 4, the controlled device 49 is connected by a switch controller 48 directly to the energy storage device 22, and the switch controller 48 is operated by a microprocessor or logic controller, represented by the load 30, to switch the high current drawing, controlled device 49 on and off, as will be explained in more detail below. This power supply 20 embodiment of FIGS. 2 and 4 is capable of handling intermittent, high current drawing controlled devices 49 in good conditions when the energy storage device 22 can be kept well-charged. However, the margin of sufficient capacity of the energy storage device 22 necessary to maintain reliable operation in this embodiment is decreased by the intermittent, high current drawing, controlled device 49 of this embodiment as compared to the more steady, but lower current draw of the load 30 described above. Therefore, in adverse conditions, such as extended periods of insufficient recharge energy from the energy recharge source 24, when the stored energy in the energy storage device 22 is drawn down and its voltage drops, the operation of the controlled device 49 may become unreliable, as will be explained in more detail below.

Figure 5:
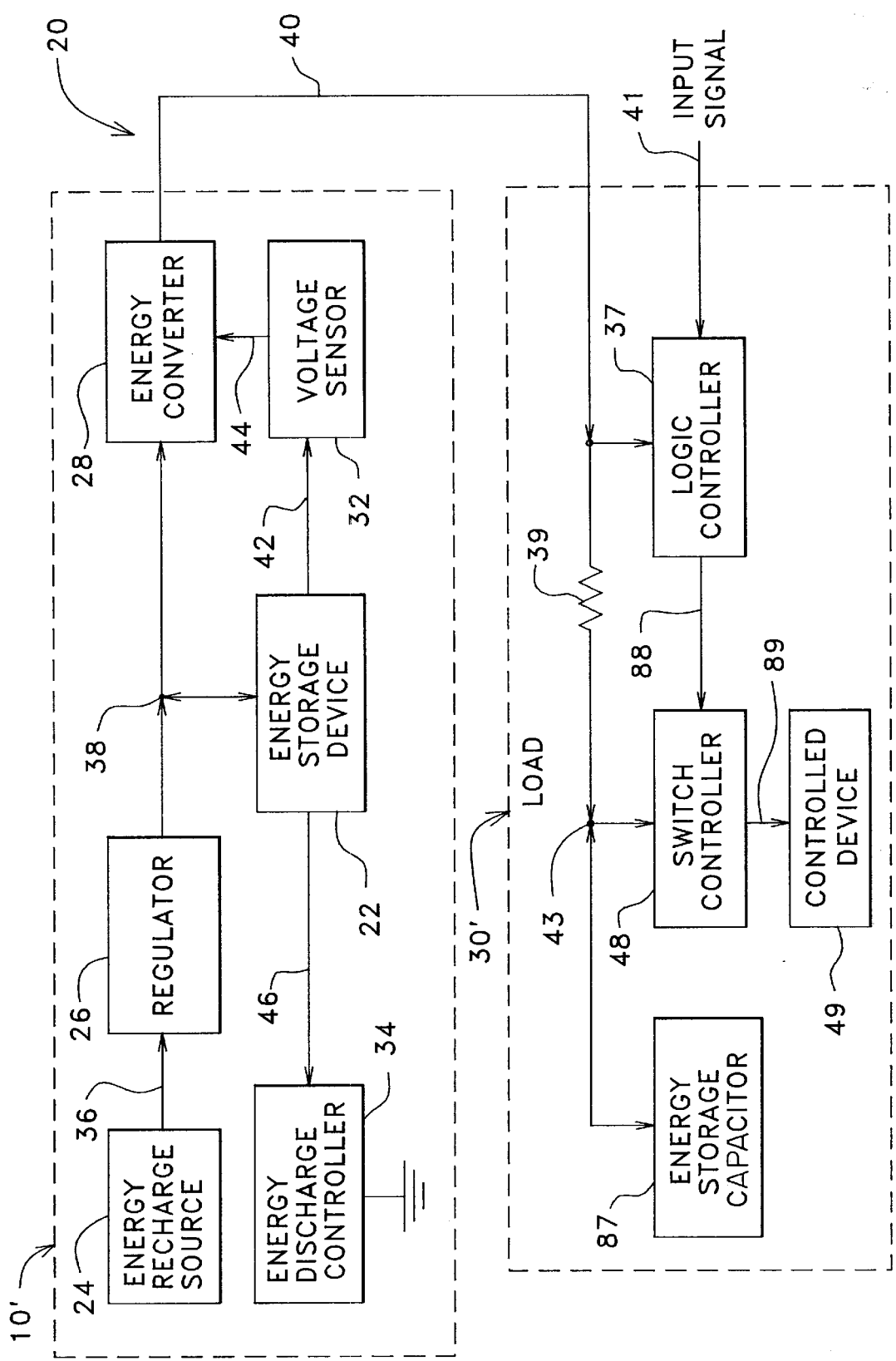
FIG. 5 is a functional block diagram of an improved high current switching power supply of the present invention in which the energy storage device is effectively isolated from power consumption spikes associated with intermittent, short or momentary, powering of the controlled device.
Figure 6:
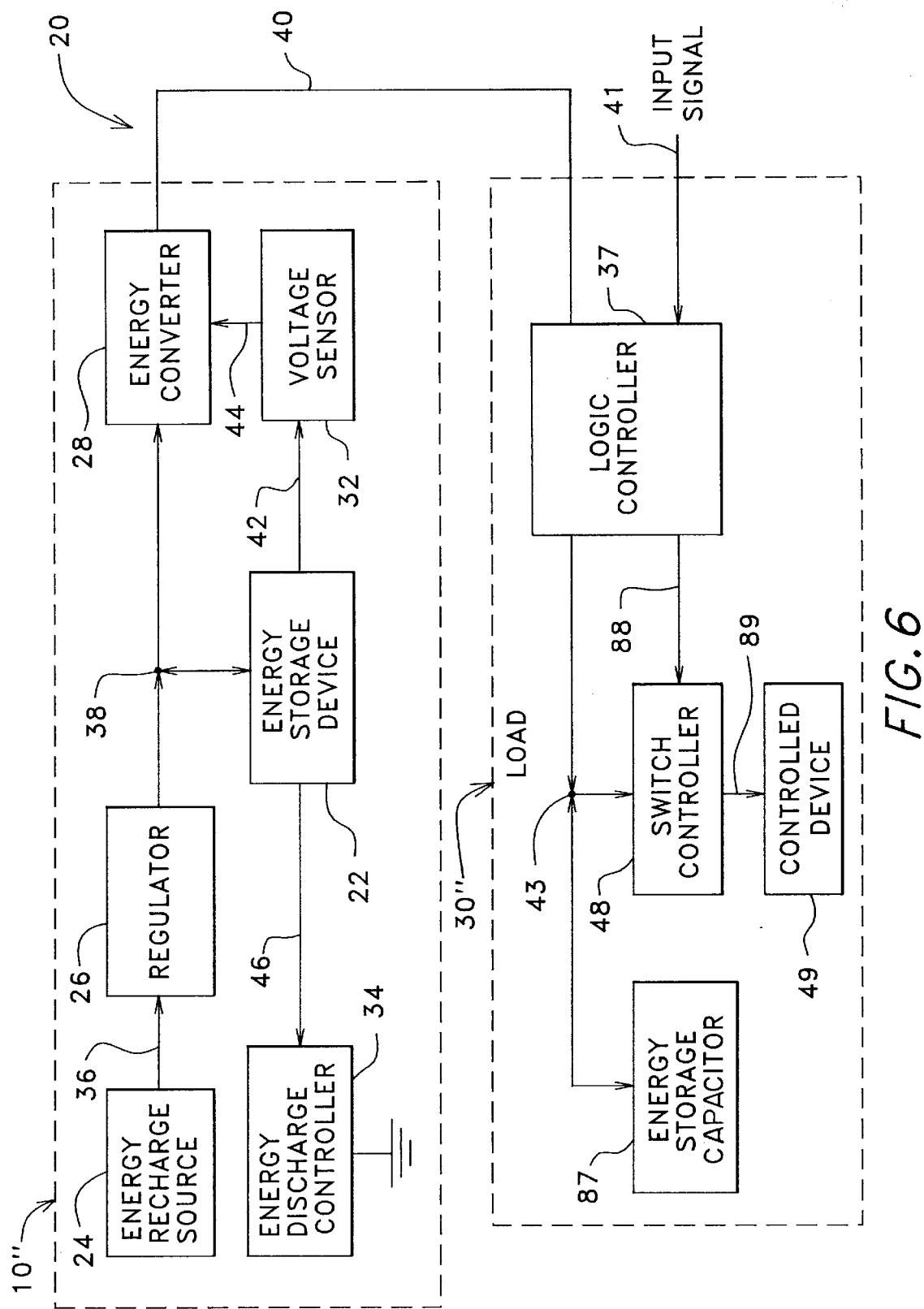
FIG. 6 is a functional block diagram of a preferred embodiment of the high current switching power supply of this invention, in which energy for the controlled device and switch controller is fed through the logic controller to further stabilize the power supply upon initial start up or restart from an energy depleted condition.
Figure 7:
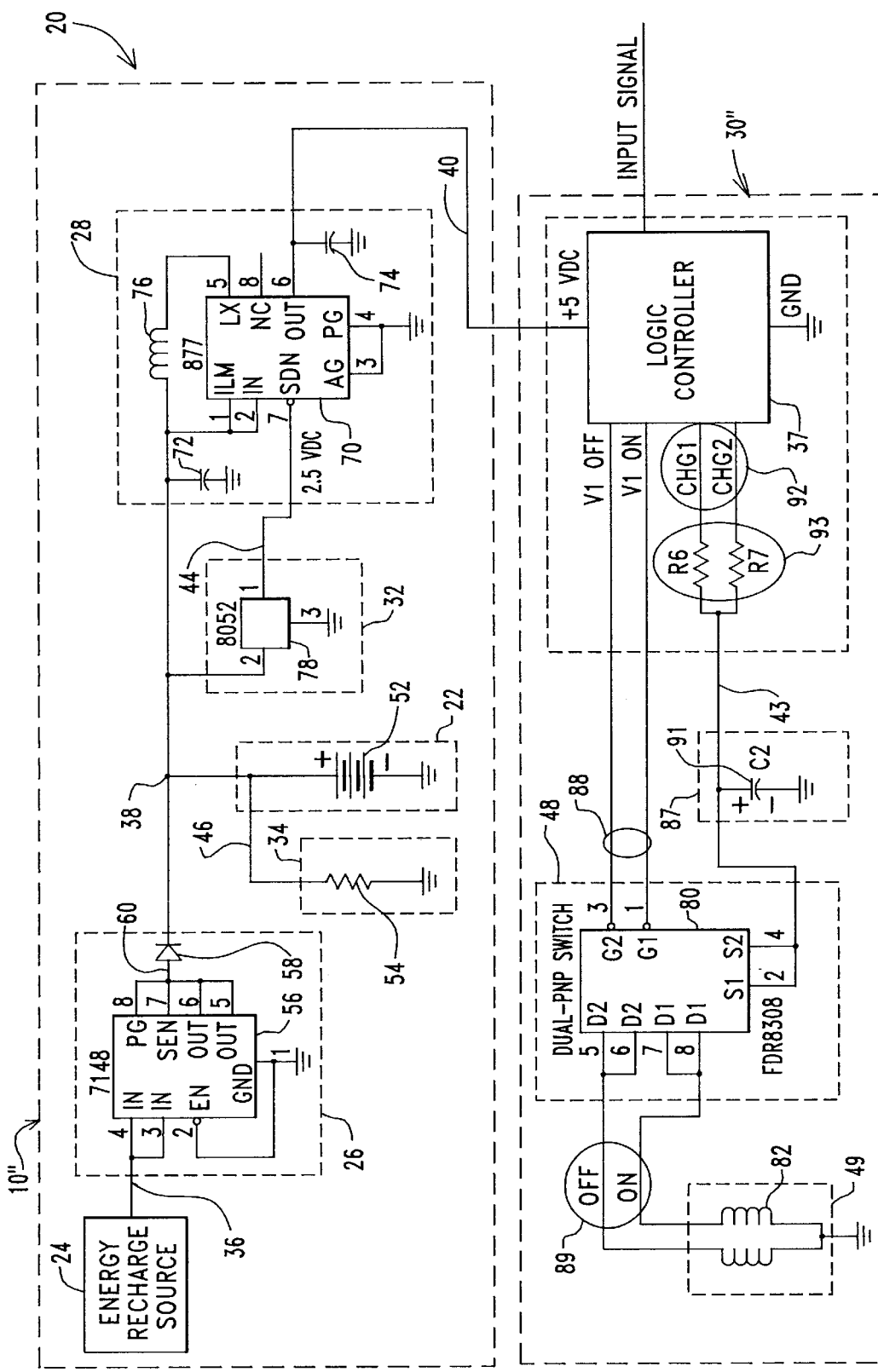
FIG. 7 is an exemplary schematic diagram of the power supply and high current switching apparatus of FIG. 6.

The improvements in the power supply 20 illustrated generally by function block diagrams in FIGS. 5 and 6 and more specifically by the circuit schematic diagram in FIG. 7 are designed particularly to adapt the power supply 20 of this invention to intermittent, momentary, high current loads, such as solenoids, relays, radio frequency or microwave transmissions, and other pulsed loads. These improvements increase reliability, while also further minimizing the energy storage device 22 capacity and voltage required to operate such intermittent, momentary, high current loads with the power supply 20. In fact, as will be described in more detail below, these improvements of FIGS. 5 and 6 virtually isolate the energy storage device 22 from voltage spikes caused by switching on and off the controlled device 49. Therefore, these improvements make possible reliable power supplies 20 that utilize even smaller and less expensive energy storage devices 22 for operating intermittent, momentary, high current drawing devices without resort to connections to 110–120 volts or 220–240 volts public utility power grids or other large capacity power sources for either initial starting or recharging.

With reference again primarily to FIG. 1, the energy recharge source 24 is connected to the optional regulator 26 via the node 36 such that energy or power generated or otherwise produced by the energy recharge source 24 is delivered to, or flows to, the regulator 26. The optional regulator 26 is connected to the energy storage device 22 and the energy converter 28 via the node 38. The regulator 26 couples the energy recharge source 24 to the energy storage device 22 and the energy converter 28 and preferably improves the matching of the power or energy output of the energy recharge source 24 to the power storage capacity of the energy storage device 22. For example, if the energy storage capacity of the energy storage device 22 is 5 volts, the regulator 26 preferably limits the voltage produced on the node 38 to no more than 5 volts to reduce and even prevent overcharging of the energy storage device 22 which might cause or lead to premature failure of the energy storage device 22. Depending on the operating conditions and capabilities of the energy storage device 22 and the energy recharge source 24, a close enough match may exist between the energy recharge source 24 and the energy storage device 22 such that the regulator 26 is not needed and the energy recharge source 24 can be connected directly to the node 38. If desired, an on/off switch (not shown) may be placed between the energy recharge source 24 and the optional regulator 26 to allow isolation of the energy recharge source 24 from the remainder of the power supply 20. Alternatively, or in addition, if desired, an on/off switch (not shown) may also be placed between the energy storage device 22 and the node 38 to allow decoupling or disconnection of the energy storage device 22 from the energy recharge source 24.

Power and energy supplied by the energy recharge source 24 is delivered to the energy storage device 22 via the node 38 to charge the energy storage device 22, i.e., to replenish and build up the energy stored in the energy storage device 22 after it has been drawn down or discharged. In addition, energy supplied by the energy recharge source 24 and/or by the energy storage device 22 is delivered to the energy converter 28 via the node 38, which, in turn, delivers energy to power the load 30 via the node 40. Preferably, the energy converter 28 is capable of creating or delivering a consistent or approximately constant output voltage level on the node 40, regardless of the input voltage level to the energy converter 28 on the node 38. For example, even if the input voltage to the energy converter 28 on the node 38 varies from less than one to more than six volts, the output voltage of the energy converter 28 on the node 40, which is supplied to the load 30, preferably remains approximately constant at 5 volts, which may be required by the load 30, especially if the load 30 includes a microprocessor or other logic controller that requires such a constant voltage input to avoid inconsistent or incorrect operation that could be caused by voltage fluctuations.

The energy converter 28, as described above, can be a conventional DC—DC voltage converter, which converts energy at higher or lower voltages on the input node 38 to a constant voltage output on the node 40. Such DC—DC voltage converters by nature have different conversion efficiency characteristics for different input voltages. At a low input voltage, the energy converter 28 may be so inefficient that it would drain all the power available from the energy storage device 22 at a rate faster than the energy storage device 22 and the energy recharge source 24 can supply and still not be able to deliver the required constant voltage, e.g. 5 volts, on the node 40. In that condition, the power supply 20 could never power the load 30. Therefore, according to a feature of this invention, the energy converter 28 is activated only when the input voltage on node 38 is high enough for the energy converter 28 to operate efficiently enough that the energy available from the combination of the energy storage device 22 and the energy recharge source 24 is sufficient for the energy converter 28 to deliver the required energy at the required constant voltage on node 40 to operate the load 30. Therefore, the energy converter 28 is activated or controlled by the sensor 32, which is connected to the energy storage device 22 via the node 42 and to the energy converter 28 via the node 44. The sensor 32 could be connected directly to node 38 to detect the voltage of the energy storage device 22, or it could be built into the energy converter 28. In any event, the sensor 32 monitors energy buildup in the energy storage device 22 and detects when the voltage in the energy storage device 22 reaches or exceeds a minimum threshold level. More specifically, the sensor 32 will preferably prevent any energy generated by the energy recharge source 24 and any energy in energy storage device 22 from being delivered to the load 30 via the energy converter 28 until such time as the energy storage device 22 has reached a minimum threshold of energy storage or a minimum charge level. For example, if the energy storage device 22 is an uncharged or low charged battery and the energy recharge source 24 is a solar panel capable of generating electric energy, the sensor 32 may prevent the energy converter 28 from delivering electric energy generated by the solar panel or stored in the energy storage device 22 to the load 30 on the node 40, so that all of the electric power or energy supplied by energy recharge source 24 flows and is delivered to the battery (i.e., the energy storage device 22), thereby charging the battery. When the battery of the energy storage device 22 obtains a minimum threshold charge level, such as, for example, 2.0 volts or perhaps 2.5 volts, depending on the components and requirements of the system, the sensor 32 may then activate the energy converter 28 so as to allow electric energy generated by the solar panel, (i.e., the energy recharge source 24) to be delivered to both the load 30, via the energy converter 28 and node 40, and to the battery 22 via node 38, thereby allowing the battery 22 to continue charging or re-energizing while providing sufficient energy on the node 40 to operate the load 30.

The minimum threshold energy or charge level of the energy storage device 22 that is chosen to trigger the sensor 32 to activate or turn on the energy converter 28, may vary, depending on the type of application. For example, the minimum energy or charge level threshold for the energy storage device 22 needed by the energy converter 28 to operate efficiently enough to power the load 30 may be determined by the power or energy requirements of the load 30 as a way of ensuring that enough stored energy exists in the energy storage device 22 to operate the load 30, if the energy recharge source 24 cannot supply sufficient energy to operate the load 30 by itself. Alternatively, the minimum energy or charge level threshold for the energy storage device 22 needed by the energy converter 28 to operate efficiently enough to power the load 30 may be determined by the capacity of the energy storage device 22, such that the sensor 32 activates the energy converter 28 when the energy storage device 22 has reached a certain percentage of its energy storage capacity. As a further alternative, the sensor 32 may be configured such that the energy converter 28 is activated only when the energy converter 28 is operating at a minimum desired efficiency level, i.e., when the energy converter 28 converts its input energy on the node 38 to output energy on the node 40 at or above a minimum efficiency level, thereby reducing wasted energy. Since the amount of energy stored in the energy storage device 22 may largely determine the operating efficiency of the energy converter 28, the efficiency level of the energy converter 28 may be heavily influenced by the energy storage capacity of the energy storage device 22, as will described in more detail below. Any of these and other alternatives for the minimum threshold energy or charge level for triggering the sensor 32 to activate or deactivate the energy converter 28 is satisfactory and considered to be an equivalent for purposes of this invention, as long as it accomplishes the goal of reliable starting of the power supply 20 for efficient energy conversion and reliable operation of the load 30 with the power available from the energy storage device 22 and/or the energy recharge source 24, as explained above. A useful target, but not a limitation, can be to set the sensor 32 to activate the energy converter 28, such activation will occur when the energy converter 28 will convert its input energy on the node 38 to constant voltage output energy on the node 40 at an efficiency greater than or equal to fifty percent (50%) and, optimally, when such conversion efficiency of the energy converter 28 is greater than or equal to seventy percent (70%).

If desired, the sensor or energy level monitor 32 may deactivate or turn off the energy converter 28 when the amount of power or energy stored in the energy storage device 22 falls below a minimum threshold level, which may be the same as or different from the minimum energy storage level in the energy storage device 22 that is required by the sensor 32 to activate the energy converter 28, in order to prevent the energy storage device 22 from completely discharging or to allow time for the energy storage device 22 to be recharged by energy supplied by the energy recharge source 24.

The energy storage device 22 is connected or coupled to the optional energy discharge controller 34 via the node 46. As previously discussed above, the optional energy discharge controller 34 allows energy or charge stored in the energy storage device 22 to be discharged. The energy discharge controller 34 preferably does not discharge the energy storage device 22 at a rate faster than the rate at which the energy storage device 22 is charged by power and energy supplied by the energy recharge source 24. However, when the energy recharge source 24 is not providing sufficient energy to the energy storage device 22, or if the load 30 is disconnected or decoupled from the remainder of the power supply 20, there may be circumstances when it is desirable to allow drainage or depletion of the energy or charge stored in the energy storage device 22. For example, if the energy storage device 22 includes Nicad batteries, such as a KR-600 AE battery manufactured by the Sony Corporation of Japan, periodically or occasionally draining or discharging the energy storage device 22 will permit long term energy storage without a loss of energy storage capacity, whereas an energy storage device 22 including such batteries maintained in a partially or fully charged state will, over time, develop a memory effect that reduces their energy storage capacity. If desired, an on/off switch (not shown) may also be placed between the energy storage device 22 and the energy discharge controller 34 to allow isolation of the energy discharge controller 34 from the remainder of the power supply 20 and to prevent unwanted or premature discharging of the energy storage device 22 via the energy discharge controller 34.

An exemplary, albeit not exclusive, schematic diagram for the power supply 20 illustrated in FIG. 1 and discussed above is illustrated in FIG. 3. For purposes of explanation, but not limitation, of the example implementation of the power supply 20 of the present invention, the energy recharge source 24 will be described as comprising a solar panel capable of producing fifty-five milliamps (55 mA) under a short circuit condition and a maximum direct sunlight open circuit output voltage of five and one-half volts (5.5 V). Such solar panels are manufactured by Solar World of Colorado Springs, Colo., U.S.A. The energy storage device 22 will be described as comprising a battery pack 52 capable of a nominal voltage of 3.6 volts and with a six hundred milliamp-hour (600 mA-hr) capacity rating. The battery pack 52 can comprise, for example, three KR-600 AE Nicad-type batteries manufactured by the Sony Corporation of Japan. A 600 mA-Hr capacity rating for the battery back 52 used in the energy storage device 22 is chosen, because an energy storage source having this rating capacity will usually be able to provide a minimum 10-day operating ability from a fully charged state without additional charging energy supplied to the energy recharge source from the energy recharge source 24, assuming that the load 30 does not, on average, draw more than about two and one-half milliamperes of current during the 10-day time period. Weight, cost, and size considerations for the battery pack 52, in conjunction with energy requirements of the intended load, however, may dictate that a battery pack with a capacity rating higher or lower than 600 mA-Hr be used for the battery pack 52 used in the energy storage device 22. The energy discharge controller 34 will comprise a resistive component 54.

An example regulator 26 may include a voltage regulator 56 and a diode 58. During normal operation, the voltage regulator 56 preferably produces an output voltage and current on the node 60 that is approximately equal to its input voltage and current on the node 36 produced by the energy recharge source 24. If, however, the input voltage on the node 36 exceeds a certain fixed threshold voltage level, the voltage regulator 56 caps or otherwise limits the output voltage on the node 60 to the fixed threshold voltage level. For example, the voltage regulator 56 may be a TPS7148 manufactured by Texas Instruments of Dallas, Tex., U.S.A., which allows its output voltage to track its input voltage linearly, unless the input voltage is greater than approximately 4.8 volts, at which time the output voltage is limited to a maximum of approximately 4.8 volts. For purposes of explanation, but not limitation, of the of the power supply 20 of the present invention, the voltage regulator 56 will be assumed to be a linear regulator that makes the output voltage on the node 60 approximately equal to the input voltage on the node 36, unless the input voltage on the node 36 is greater than 4.8 volts, during which time the voltage regulator 56 will cap the voltage on the node 60 to 4.8 volts.

The diode 58 may be a SLG41–20 diode manufactured by General Instrument of Melville, N.Y., U.S.A. For purposes of explanation, but not limitation, of the power supply 20, the diode 58 will be assumed to have a one-half volt voltage drop across it, thereby making the voltage on the node 38 one-half volt less than the voltage on the node 60, when the energy recharge source 24 is generating energy. The diode 58 also prevents electric current from flowing from the battery pack 52 into the voltage regulator 56 and, as a result, prevents discharge of the battery pack 52 or the flow of electric current into the energy recharge source 24. The diode 58 may not be needed for such purposes, if either the voltage regulator 56 or the energy recharge source 24 itself can prevent the flow of electric current from the node 38 into the energy recharge source 24.

As previously discussed above, the energy converter 28 preferably is capable of creating a consistent output voltage level on the node 40, regardless of the input voltage level on the node 38. The energy converter 28 may include a MAX877 Step-up/Step-down DC—DC Voltage Converter 70 manufactured by Maxim Integrated Products of Sunnyvale, Calif., U.S.A., and the filter capacitors 72, 74 and the inductor 76, which provide supporting electronic circuitry for the voltage converter 70. The capacitor 72 may have a value of, for example, twenty-two microfarads, and is used to filter electrical input noise to the converter 70. The capacitor 74 may have a value of, for example, sixty-eight microfarads, and is used to filter the converter's 70 switching noise from the load 30. The inductor 76 may have a value of, for example, twenty-two microhenries, and is used to control switching frequency of the converter 70. For purposes of explanation, but not limitation of this example, the energy converter 28 will be assumed to create a five-volt output signal on the node 40, when the energy converter is activated by the sensor 32.

As previously discussed above, the sensor 32 monitors the energy or voltage level of the energy storage device 22, which, in this example, includes the battery pack 52. Until such time as the sensor 32 senses or detects a minimum threshold voltage level in the battery pack 52 of, for example, two and one-half (2.5 V), the sensor 32 maintains a logic low voltage signal on the node 44 connected to the energy converter 28, i.e., the voltage converter 70, thereby keeping the energy converter 28 deactivated or turned off and preventing the energy converter 28 from supplying output energy on the node 40. When the sensor 32 senses or otherwise detects the minimum voltage level of two and one-half volts (2.5 V) in the battery pack 52, the sensor 32 creates a logic high voltage signal on the node 44 connected to the energy converter 28, thereby activating or turning on the energy converter 28 such that the energy converter 28 provides energy on the node 40 for delivery to the load 30. The sensor 32 can be, for example, a S8052ALR Voltage Detector 78 manufactured by Seiko Corporation of Japan.

Since the energy converter 28 preferably converts a range of input energy levels or voltages on the node 38 to a generally stable output energy level or voltage on the node 40, the energy converter 28 will generally operate at different levels of efficiency. For example, the energy converter 28 may create a constant output voltage on the node 40 more efficiently when the input voltage to the energy converter 28 on the node 38 is within a range of voltages than when the input voltage to the energy converter 28 on the node 38 is not within the range. The voltage level on the node 38 is the same as the voltage level of the battery pack 52. More specifically, for the implementation power supply 20 illustrated in FIG. 3, the voltage converter 70 forming the basis of the energy converter 28 provides a 5-volt output signal on the node 40 most efficiently when the input voltage on the node 38 is in a range between 2.5 volts and 3.6 volts. Therefore, for purposes of conserving energy and ensuring that inefficient energy converter 28 power consumption does not interfere with or prevent the self-start function described above, the sensor 32 preferably only activates the energy converter 28 when the voltage level of the battery pack 52 comprising the energy storage device 22 exceeds 2.5 volts. Since the battery pack 52 forming the energy storage device 22 is chosen in this example to have a nominal capacity of 3.6 volts, and since the sensor 32 is designed to activate or turn on voltage converter 70 only after the battery pack 52 has been charged to a minimum of 2.5 volts, the energy converter 28 will operate primarily when the input voltage on the node 38 is between 2.5 volts and 3.6 volts, which is the desired efficiency range for the voltage converter 70.

The optional energy or power discharge controller 34 coupled to the battery pack 52 includes a resistive component 54, which allows energy stored in the battery pack 52 to be discharged or drained over time. The resistive component 54 is connected to the battery pack 52 via the node 46. The node 46 is itself connected to the node 38 such that nodes 38, 46, and 42 form a single node. The preferred state of charge for a battery pack, particularly a Nicad type battery pack 52, when the load 30 is removed from the power supply 20, is a zero charge or dead battery state in which no energy or charge is stored within the battery pack 52. A zero charge or dead battery state of a battery or battery pack 52 permits long term storage of the battery or battery pack 52 without unnecessary loss or reduction in the battery or battery pack's 52 full charge capacity. In contrast, a Nicad battery or battery pack 52 stored in a partially or fully charged state will, over time, develop a memory effect that reduces battery capacity.

The resistive component 54 is oriented across the battery pack 52 such that a current drain for the battery pack 52 is created, thereby discharging the battery pack 52. Preferably, the value for the resistive component 54 is chosen large enough so that the battery pack 52 does not drain too fast and small enough so that the battery pack 52 does not drain too slow. More specifically, the value for the resistive component 54 should be chosen large enough such that battery pack 52 is not discharged faster than the battery pack 52 is being charged by energy supplied by the energy recharge source 24 via the node 38, but not so large that it prevents the battery pack 52 from being nearly or completely discharged during periods of storage or non-use. For the electric circuit configuration illustrated in FIG. 3, the value for the resistive component 54 is preferably in a range between five thousand and one hundred thousand ohms and is optimally ten thousand ohms. When the battery pack 52 is charged to its rated capacity of 600 mA-Hrs, a ten thousand ohm value for the resistive component 54 provides a current load for the battery pack 52 that is less than one-thousandth (1/1000) of the rated capacity (600 mA-Hrs) of the battery pack 52. Thus, given a fully charged battery pack 52 that is not periodically charged by energy supplied by the energy recharge source 24 or delivering energy to the load 30 via the energy or power converter 28, the battery pack 52 will take more than one thousand hours to discharge via the resistive component 54 and will, after being fully discharged, be maintained in a fully discharged state until it is recharged at a later time. The resistive component 54 could be a thick film chipresistor, such as a MCR18EZHUFX1002, manufactured by Rohm Electronics of Anitoch, Tenn. to provide this battery drain function.

Since the maximum voltage supplied by energy recharge source 24, the voltage regulator 56, and the diode 58 on the node 38 is 4.3 volts (4.8 volts maximum supplied by the voltage regulator 56 on the node 60 minus the one-half voltage drop across the diode 58), and the maximum voltage of the battery pack is 3.6 volts, the battery pack 52 is not so undersized that significant premature failure of the battery pack 52 is likely to occur. Of course, the energy recharge source 24, regulator 26, and energy storage device 22 can be chosen and configured such that a closer match exists. Also, improvements in other embodiments of this invention, as will be described below, enable use of even smaller capacity battery packs for the energy storage device 22 and lower threshold voltage levels for efficient operation of the energy converter 28 for smaller, less expensive, but still reliable, power source 20 configurations and implementations.

The second embodiment of the power supply 20 of the present invention shown in FIG. 2 includes a switch controller 48 connected or coupled to the load 30 via a node 50 and also connected or coupled to the node 46. In this configuration, power is supplied to the load 30 via the node 40 as previously discussed above and to the switch controller 48 via the node 46. This second embodiment of the power supply 20 is particularly well suited to applications where the load 30 is a microprocessor, sensor, or other device that needs a constant energy source to maintain operation and determines when the switch controller 48 is to be activated and the switch controller 48 requires its own power for operation. For example, the switch controller 48 may be, or may control the operation of, an electrical relay, solenoid valve, pneumatic valve, switch, pump, transmitter, or other controlled device 49 and will need its own power or energy supply for activation of the controlled device 49.

The microprocessor or logic controller of load 30 determines when the switch controller 48 is to be activated and deactivated and controls the operation of the switch controller 48 via the node 50. When activated by the microprocessor or logic controller of load 30, the switch controller 48 may activate itself and then activate the controlled device 49. Preferably, when the energy converter 28 is not supplying energy to the load 30, the switch controller 48 is shut down, deactivated, or otherwise prevented from providing a control signal to the controlled device 49 such that energy stored in the energy storage device 22 is not drained via the switch controller 48. Otherwise, the switch controller 48 and/or the controlled device 49 could drain enough energy from a low-charged energy storage device 22 and from the energy recharge source 24 that it prevents the energy storage source 22 from ever being recharged to the minimum voltage level required for the sensor 32 to activate the energy converter 28, as described above, and thereby interfere with initial start or restart of the power source 20 from a dead or very low charge state of the energy storage device 22. Thus, the energy converter 28 preferably supplies power to the load 30 as a prerequisite to the switch controller 48 providing energy or power to the controlled device 49. However, this preference presents some problems, such as the inability to use a P-channel (PNP) type transistor or power switch for the switch controller 48, because such PNP devices are enabled, i.e., turned on, in a control power-off state, which would allow the undesirable energy drain by the controlled device 49 that could interfere with, or even prevent, the self-starting function of the power source 20, as explained above. Improvements provided by other embodiments of this invention, as will be described below, can be used to avoid this problem, if desired.

An example implementation of the second embodiment of the power supply 20 of FIG. 2 and described above is illustrated in FIG. 4 and includes the switch controller 48 connected to the load 30, which can be a microprocessor or other logic controller or circuit, via the node 50 and connected to the battery pack 52 via the node 46. As previously discussed above, the switch controller 48 allows a solenoid valve, switch, pump, relay, transmitter, or other controlled device 49 to be controlled by the load 30, while also allowing the controlled device 49 to have power supplied to it directly from the energy recharge or supply source 24 via the regulator 26 and/or from the energy or power storage device 22. In the example implementation illustrated in FIG. 4, the switch controller 48 includes a TPS2015 Power Distribution Switch 80 manufactured by Texas Instruments of Dallas, Tex., U.S.A., which is used to energize the controlled device 49 which is, in this example, a solenoid 82. Energy to energize the solenoid 82 is provided to the power distribution switch 80 by the battery pack 52 via the node 46. The load 30 supplies a signal on the node 50 to the power distribution switch 80, which signal controls when the power distribution switch 80 energizes or activates the solenoid 82. The power distribution switch 80 incorporates a shut down feature such that power is not supplied to the solenoid 82 when the voltage level stored in the battery pack 52 is less than approximately 3.2 volts. This shut down feature prevents a high rate drain of the battery pack 52 when power converter 70 is not providing power to the load 30 via the node 40 and the load 40 is not providing an active logic control signal to the power distribution switch 80 via the node 50. Thus, the converter 70 preferably supplies power to the load 30 as a precedent to the switch controller 48 providing energy or power to the controlled device 49 (i.e., the solenoid 82).

Reliable operation of such controlled devices 49 as solenoid valves, stepper motors, radio wave or micro-wave transmitters, alarms, and the like, typically requires an electrical power supply that is capable of providing one or more amperes of electrical current over time periods ranging from tens to several hundred milliseconds. In many instances where such power loads are present, the electrical resistance and the minimum required electrical current of the controlled device 49 are known operating constants. The voltage operating characteristics for such controlled devices 49 are defined by Ohm's law and are represented by the simple equation:

$$V = (I) \times (R), \quad (1)$$

where V is the voltage applied to the controlled device 49 in volts, I is the minimum required current in amperes, and R is the equivalent load resistance of the controlled device 49 in ohms. From this simple equation (1), it is apparent that, with a fixed and constant load resistance R, the electrical current supplied to the controlled device 49 is directly proportional to the electrical voltage V applied across the controlled device 49. Thus, to maintain the minimum electrical current I that is required to operate the controlled device 49, a minimum electrical voltage V must be applied across the controlled device 49 for reliable operation of the controlled device 49.

Instrumentation operating a controlled device 49, such as a solenoid valve or electrical relay, making small motor-controlled adjustments, or transmitting short bursts of data by radio wave or microwave, and other devices with similar load characteristics that are powered by a stored energy source, such as a battery or a capacitor, are limited by the voltage, internal resistance, and current sourcing characteristics of the energy storage device. These characteristics vary according to the state of charge of the energy storage device. Further, a typical energy storage device, such as the energy storage device 22 of power source 20, exhibits its maximum voltage and its minimum internal resistance (and by inference using Ohm's law expressed by equation (1) above, its maximum current sourcing capability) in a fully-charged state. As the energy storage device 22 discharges, its voltage decreases, and its internal resistance increases (and by inference using Ohm's law, its current sourcing capability decreases) until the energy storage device 22 reaches a discharged state and is unable to power the controlled device 49. The rate or extent of the degradation in a particular battery's voltage and corresponding increase in its internal resistance depends on at least three factors: (1) the type of the battery—non-rechargeable or rechargeable; (2) the particular battery's chemistry—alkaline, nickel cadmium, nickel metal hydride, lithium ion; and (3) the ambient operating temperature of the battery. Most battery performance degrades significantly at temperatures above 100° F. (37° C.) and below 32° F. (0° C.).

To illustrate, in the example, power supply 20 described above, in which the energy storage device 22 is equipped with a 3-cell, series-connected, battery pack 52, as shown in FIG. 4, and a switch 80 to apply momentary pulses of power to a controlled device 49 comprising, for example, a pneumatic solenoid valve may have a solenoid coil 82 with a dc resistance of 3.4 ohms and requires a minimum dc current of 1.0 ampere to operate. The battery pack 52 voltage varies from 4.4 volts dc when fully charged to 3.0 volts dc at its effective discharge state, with 3.6 volts dc being the nominal charged voltage. Using Ohm's law from equation 1 above, the operating current available to the controlled device 49 over the battery voltage range would vary from:

| Battery | Resistance | Current |
|---------|------------|---------|
| 4.4 V   | 3.4 Ω      | 1.29 A  |
| 3.6 V   | 3.4 Ω      | 1.05 A  |
| 3.4 V   | 3.4 Ω      | 1.00 A  |
| 3.0 V   | 3.4 Ω      | 0.89 A  |

This table illustrates that, at some point during the battery 52 discharge cycle, the current flow available to the controlled device 49 switching function would drop below the minimum 1.0 ampere current requirement of the solenoid coil 82 in this example, and the operation of the controlled device 49 would become unreliable. In fact, the minimum 1.0 A current requirement for the 3.4 Ω solenoid coil 89 resistance of this example is reached when the battery 52 voltage falls to 3.4 V. Therefore, there is only a 0.2 V margin between the 3.6 V nominal charged voltage of the battery pack 52 and the minimum 3.4 V necessary to provide the minimum 1.0 A current. When also factoring in the adverse effects that cold and hot ambient temperature has on battery 52 performance, the reliable operation of the power supply 20 for such controlled devices 49 can be significantly restricted.

Of course, a bigger battery pack 52 to obtain more storage capacity and a higher working voltage could be used to alleviate this problem. For example, a 6.0 V dc battery pack 52, instead of the 3.6 V de battery pack described above, would extend the effective operating range of the solenoid valve circuit of the above example. However, such a bigger battery imposes extra and unnecessary weight, physical size, and cost to the system's design. Additionally, such higher battery voltage would tend to provide more current to the controlled device 49 than is required, except in significantly discharged or extreme temperature conditions. Following the solenoid valve circuit example described above, a 6.0 V dc battery pack 52 for the energy storage device 22 would supply 1.76 A of current to the solenoid valve, i.e., 76% more current than the 1.0 A required for its reliable operation, thereby effectively wasting power and accelerating the rate of the battery's discharge.

Even if the minimum current requirement for a particular controlled device 49 is less than 1.0 A, or if it has a resistance load of less than 3.4Ω, so that something less than 3.4 volts is needed for its reliable operation, the TPS2015 Power Distribution Switch 80 in the FIG. 4 circuit requires a minimum 3.2 V to operate. Therefore, the marginal voltage difference between the 3.6 V nominal voltage of the example battery pack 52 and the 3.2 V minimum for switch 80 operation is only 0.4 V, which is too narrow a voltage operating range for discharge conditions or diminished capacity of the battery pack in cold weather or other extreme temperature conditions.

The most effective switch apparatus for automating such high current switched controlled device 49 functions is a P-channel (PNP) type transistor or power switch in the high side switch configuration. Although such PNP transistors typically work well in these types of intermittent, momentary, high current, switch controller 48 applications, they require a logic low control signal to disable (turn off), and, conversely, a logic high control signal to enable (turn on) power to the controlled device 49. This power control configuration presents a problem when the power needed to start up the equipment or instrumentation needed to control and operate such controlled devices 49 is initially applied, since the PNP transistor power to the controlled device 49 is enabled (turned on) in a control power-off state. This problem becomes particularly apparent when such PNP transistor-type switch controllers 48 are employed in the low-voltage, low-power, self-starting, battery-powered power supply 20 of FIGS. 2 and 4, where large, uncontrolled start-up power loads in the controlled devices 49 can inhibit or prevent the self-starting function described above by pulling the battery 52 voltage below the threshold needed to activate the energy converter 28.

The modified power supply 20 embodiments of this invention illustrated in the function block diagrams of FIGS. 5 and 6 both provide solutions to these problems of diminished reliability when the power supply 20 is used to power intermittent momentary, high current pulses or switching functions. In both of these FIGS. 5 and 6 power supply 20 embodiments, the direct connection of the switch controller 48 and controlled device 49 in the previously described FIG. 2 embodiment to energy storage source 22 via node 46 is eliminated. Instead, these components, i.e., the switch controller 48 and the controlled device 49, derive their power from the energy converter 28, either directly in the FIG. 5 embodiment or through a logic controller 37 in the FIG. 6 embodiment, as will be described in more detail below. Therefore, both the switch controller 48 and controlled device 49 are shown as part of the load i.e., load 30' in FIG. 5 and load 30" in FIG. 6, which is powered by the energy output of the energy converter 28 on the node 40. However, in both of the circuit configurations shown in FIGS. 5 and 6, the energy storage device 22 is buffered to the extent of being virtually isolated from the power consumption spikes of the switch controller 48 and controlled device 49 by a very high capacity, fast chargeable and dischargable, energy storage capacitor 87, preferably of the type known as a super capacitor, which provides the intermittent, high current, switching pulses needed to power the switch controller 48 and controlled device 49. The energy storage capacitor 87 is charged initially and then recharged between the high current pulses by the constant voltage output of the energy converter 28 on node 40 over a time period and at a rate that has little short term effect on either the voltage level or the charge/discharge cycle of energy storage device 22.

Conversely, a significant feature of this improvement in the FIGS. 5 and 6 embodiments of the power supply 20 is that this configuration also effectively isolates the switch controller 48 and controlled device 49 from voltage variations associated with the energy storage device 22, such as may occur during times in which the energy recharge source 24 is unable to maintain a full or nearly full charge in the energy storage device 22 or when extreme hot or cold ambient temperatures diminish the capacity of the storage device 22, when the voltage level of the energy storage device falls below the minimum threshold voltage required by the switch controller 48 or by the controlled device 49 to function reliably. Therefore, in contrast to the FIGS. 2 and 4 embodiments, the switch controller 48 and controlled device 49 in the FIGS. 5 and 6 embodiments can still operate reliably, when the voltage of the energy storage device 22 falls below the minimum threshold, e.g., 3.2 V in the example above, required by the switch controller 48 to operate reliably. Of course, the voltage of the energy storage device 22 still has to be above the minimum threshold, e.g., 2.5 V in the example above, set by voltage sensor 32 for activation of the energy converter 28, i.e., where the energy converter 48 can operate with sufficient efficiency, e.g., 50% conversion efficiency in the example above, for stable operation of the power subsystem 10 of the power supply 20, as described above. However, as also described above, that minimum voltage threshold for sufficiently efficient operation of the energy converter 28 can be lower than the minimum voltage threshold required by the switch controller 48 to operate reliably, e.g., 2.5 V for the energy converter 28 and 3.2 V for the switch controller 48 in the above-described example, thereby extending the reliable operation of the power supply 20 of FIGS. 5 and 6 to an additional 0.7 V discharge range of the energy storage device 22 as compared to the FIGS. 2 and 4 embodiment.

Consequently, the power subsystem 10 of the power supply 20 in the FIGS. 5 and 6 embodiments, comprising the energy storage device 22, energy converter 28, voltage sensor 32, energy recharge source 24, optional voltage sensor 32, energy recharge source 24, optional voltage regulator 26, optional energy discharge controller 34, and interconnecting nodes 36, 38, 44, 46, operate much the same as described above in relation to the FIGS. 1–4 embodiments. In fact, because of the effectiveness of the load subsystems 30' and 30" of the FIGS. 5 and 6 embodiments of the power supply 20 in effectively isolating the switch controller 48 and controlled device 49 from the voltage variations in the energy storage device 22 and in buffering and virtually isolating the energy storage device 22 from the intermittent, momentary, high current draws of the switch controller 48 and controlled device 49, according to this invention, the energy storage device 22 can be substantially smaller than previously thought and still operate the switch controller 48 and controlled device very efficiently and reliably. For example, the minimum 1.0 A draw of the 3.4Ω latching solenoid example described above, which would tax the reliability of the FIGS. 2 and 4 power supply 20 embodiment equipped with a nominal 3.6 V rechargeable Nicad battery for the energy storage device 22, can be operated very efficiently and reliably with the power supply 20 embodiment of FIGS. 5 and 6 equipped with only a 1.8 V, or even as low as 0.8 V, Nicad battery for the energy storage device 22. Of course, the energy converter 28 would have to be one that has a sufficient operation efficiency curve in such low voltage ranges to prevent the kind of excessive, below threshold, power drain that would inhibit the self-starting feature described above, but such efficient, low-voltage power supplies are now commercially available. The voltage sensor 32 would also have to be set at a commensurate lower voltage threshold for activating the energy converter 32 at the appropriate efficiency range, as described above.

Further, a P-channel, i.e., PNP transistor-type switch controller 48 can be used in the FIGS. 5 and 6 embodiments, because, even though such PNP-type switch controller 48 are closed in the "dead" or zero voltage state, there is no direct connection of the switch controller 48 and controlled device 49 to the energy storage device 22, as there is in the previously described FIGS. 2 and 4 embodiment. Therefore, even when there is no power on node 40 to the logic controller 37 (i.e., no control signal to switch controller 48) and the switch controller 48 is in a power-off state (i.e., its switch to load mode is enabled) it still cannot drain energy from the energy storage device 22 and thereby inhibit the self-start feature of the power subsystem 10 from a dead or very low charge state of the energy storage device 22.

In the load sub-system 30' illustrated in FIG. 5, the energy storage capacitor 87 is connected via node 43 and, optionally, via a resistive element 39, to the constant voltage output of the energy converter 28 on node 40 in parallel with the logic controller 37, which is also powered by the constant voltage output of the energy converter 28 on node 40. Therefore, the energy storage capacitor 87 is charged initially, and subsequently recharged, by the constant voltage energy output of the energy converter 28 via node 40, and, optionally, via current limiting resistive element 39. The controlled device 49 is also connected to node 43 via the switch controller 48, so the immediate, high current draw of the switch controller 48 and controlled device 49 is supplied almost entirely by the energy storage capacitor 87, as will be explained in more detail below. The particular application of the controlled device 49, e.g., electrical relay, solenoid valve, pneumatic valve, switch, pump, RF or microwave transmitter, or other controlled device 49, will determine the timing and duration of the activation and deactivation controlled device 49 by the switch controller 48. This function is programmed into, and/or controlled by, the logic controller 37 via node 88. In other words, the logic controller 37 signals the switch controller 48 to activate and deactivate the controlled device 49.

More specifically, the regulated, constant voltage, e.g., 5.0 V, output of the energy converter 28 supplies charging current via node 40 and, optionally, through the current limiting resistor 39, to node 43 for charging energy storage capacitor 87. The optional current limiting resistor 39 is chosen to minimize initial power-up current loading i.e., current draw by the energy storage capacitor 87, when the voltage sensor 32 activates the energy converter 28 as the energy storage source 22 is being charged up from a "dead" or very low charge state, especially if the energy storage capacitor 87 is also in a low charge state. It is also chosen to isolate the logic controller 37 from voltage variations on node 43 caused by discharge of the energy storage capacitor 87 as the controlled device 49 is activated by switch controller 48. Although in many applications current limiting resistor 39 may be unnecessary, in this particular application, the current limiting resistor 39 is chosen to limit charging current 40 to less than the maximum recharging current supplied by energy recharge source 24. For example, a current limiting resistor 39 of about 100 ohms in the example described above with a constant 5.0 V volts on node 40 would, according to Ohm's law (V=I×R), limit energy storage capacitor 87 recharge current to about 50 mA.

As was mentioned previously, the activation of the controlled device 49 by the switch controller 48 is a short, high intensity, current draw event or pulse, and the current for the pulse is drawn almost entirely from the energy storage capacitor 87. After powering the momentary, pulsed load of the controlled device 47, the energy drawn from the energy storage capacitor 87 and utilized by the controlled device 49 is replenished by the energy storage device 22 and/or the energy recharge source 24 via the energy converter 28. Therefore, the energy storage capacitor 87 will be ready to deliver additional energy to power the next pulse of the controlled device 49, as dictated by the logic controller 37 and switch controller 48.

The role of the energy storage capacitor 87 in this application i.e., providing high current pulses of energy intermittently to power the controlled device 49, is not an easy one to fill. Until recently, there was no form of electrical energy storage device available with which to design practical and cost-effective circuit for powering a short, high current, pulse of electric current for a load under the constraints of small, limited capacity power sources. Capacitors have some inherent advantages over batteries, such as: (i) Storage capacity is not affected by charge rate; (ii) Temperature has minimal effect on capacitor performance; and (iii) Charge/discharge cycles do not affect useful lifetime of a capacitor. However, energy storage capacity for most kinds of capacitors is very limited. Capacitance can be determined by:

$$C=(Q)/(V) \qquad (2)$$

where C is capacitance in farads, Q is charge in coulombs, and V is the voltage in volts. The charge Q can also be stated in terms of its equivalent units of amperes-second, i.e., current I times time t, so, substituting I×t for Q in equation (2) provides:

$$C=[(I)\times(t)]/V, \qquad (3)$$

where I is current in amperes and t is time in seconds. Therefore, for the previously described example, wherein the controlled device 49 is a solenoid valve that draws a 1.47 A current pulse for 0.045 seconds, i.e., 45 milliseconds (ms), at a voltage of 5.0 V dc, the capacitance required to drive such a solenoid valve is determined from equation (3), as follows:

$$C=[(1.47A)\times(0.045 \text{ seconds})]/(5.0 \ V)=0.013 \text{ farads.}$$

Therefore, a capacitance of 0.013 farads, i.e., 13,000 microfarads, is needed to operate the example solenoid valve for one pulse.

The usual basic types of capacitors and the normal, commercially available capacitance ranges of each include: (i) aluminum electrolyte—1 to 10,000 microfarads; (ii) tantalum electrolyte—0.01 to 500 microfarads; (iii) ceramic—0.0001 to 10 microfarads; and film—1 picofarad to 1 microfarad. Therefore, of those types, only the aluminum electrolyte-type capacitor even comes close to having the capacitance necessary to provide the 13,000 microfarads required by the solenoid valve of the above example, which is not atypical of the kinds of controlled devices 49 contemplated for use with the power supply 20 of this invention. However, typically, the physical size of a capacitor is directly proportional to its capacitance, and an aluminum electrolyte capacitor with capacitance in the 13,000 microfarad range would be quite large, i.e., in a package on the order of a cylinder three inches in diameter and six inches long. Such a large capacitor is not conducive to the goal of a smaller, less expensive, but reliable, power supply according to this invention, and it is much larger than batteries of comparable storage capacity. The necessity of such a large size for a moderate energy storage capacity is one reason such capacitors have not been utilized for small power supply applications. Ceramic "super capacitors" are available with large capacitances in smaller physical sizes, e.g., 47,000 microfarads in a cylindrical package about one inch diameter and one-half inch high, but such ceramic super capacitors have typically had high equivalent series resistance (ESR), which severely limits how fast they can release or discharge the stored energy and renders them incapable of providing a high current pulse, such as the current pulses required to power a solenoid valve or other high current switching controlled device 49 of the type for which the power supply 20 of this invention is intended.

Fortunately, for purposes of this invention, a new type of super capacitor has become commercially available recently, which provides very large capacitance, small physical size, and low ESR, i.e., fast discharge capability. For example, a super capacitor, part no. BZ015A503ZAB35, manufactured by AVX Corporation of Myrtle Beach, Calif., has a rated capacitance of 0.06 farad (60,000 microfarads) at 5.5 V dc with a 0.2 Ω ESR. When this new type of super capacitor is used as the energy storage capacitor 87 in the power supply 20 of this invention and charged to the example 5.0 V provided by the energy converter 28 on node 40, as illustrated in FIG. 5, it has a capacitance of about 60,000 microfarads, which can power the example controlled device 49 load requiring about 13,000 microfarads for as many as 5 pulses on one charge.

Of course, unless the energy storage device 22 becomes discharged below the threshold minimum voltage needed to operate the energy converter 28 efficiently so that the voltage sensor 32 deactivates the energy converter 28, as described above, the energy discharged by the energy storage capacitor 87 to power the controlled device 49 will be recharged immediately after each such pulse or operation event of the controlled device 49. The time to recharge energy storage capacitor 87 after each switching operation of controlled device 49 with a current limiting resistor 39 value of 100Ω is found using the simple RC time constant formula:

$$t=(R)\times(C), \qquad (4)$$

where t is time, C is the minimum required capacitance to switch controlled device 49 and R is the current limiting resistor 39. In the example described above:

$$t(100\Omega)\times(0.013F)=1.3 \text{ seconds.}$$

Hence, the configuration and example represented in FIG. 5 will reliably sustain a controlled device 49 switching rate of 1.3 seconds. Current limiting resistor 39 may be adjusted to meet specific application requirements in terms of switching rate. Of particular note is that as the application-specific switching rate of the controlled device 49 decreases, the average current load on energy converter 28 required to recharge energy storage capacitor 87 also decreases significantly. For example, a switching rate of 1 minute would require approximately 0.001 amperes (1 mA) average current drain from a 5 V dc energy converter 28, thus from the energy storage device 22 and/or the energy recharge source 24. Less frequent switching, i.e., activation of the controlled device 49 by the switch controller 48, would require even less average current drain from the energy storage device 22 and/or the energy recharge source 24. Thus smaller capacity energy storage devices 22 and small capacity energy recharge sources 24 become very feasible for reliable operation of pulsed, high current controlled devices 49 with the power supply 20 of this invention.

Logic controller 37 is generic and may be composed of a combination of discrete logic gates, timing circuits, or a single chip microcomputer that applies control signals to selectively turn on and turn off switch controller 48 via node 88 which, in turn, applies electrical current from energy storage capacitor 87 via nodes 43 and 89 to controlled device 49. For example, but not for limitation, a part no. MC68HC711E9CFN2, single-chip, 8-bit microcontroller, manufactured by Motorola, Inc., of Phoenix, Ariz., powered by the 5.0 V constant voltage output of the energy converter 28 on node 40, could provide the high and low digital logic signals to a PNP-type transistor switch controller 48. However, if the energy storage device 22 is dead or in a very low charge state, in which the voltage sensor 32 keeps the energy converter 28 deactivated, at least until the energy recharge source 22 can recharge the energy storage device 24 to a voltage above the minimum voltage threshold, as described above, the controlled device 49 cannot drain energy from the energy storage device 22, even though the logic controller 37 is unpowered and cannot provide the logic signal needed for the PNP-type transistor switch controller 48 to open the circuit between the controlled device 49 and the node 43 in the FIG. 5 embodiment.

The logic controller 37 can be self-contained with criteria for generating control logic signals to the switch controller 48, such as if it is programmed to operate the controlled device 49 at certain timed intervals, or it can be programmed to respond to input signals 41 from outside the load subsystem 30'. For example, input signals 41 could be generated by some external transducer, such as a pressure sensor, temperature sensor, other microprocessor, manual switch, or any other device (not shown), depending on the particular controlled device 49 to which the power supply 20 is applied. For example, a solenoid valve (controlled device 49) may be powered to open a flow line (not shown), when a pressure transducer (not shown) detects a certain pressure level in a vessel (not shown) and provides a signal 41 to the logic controller 37. For another example, a radio frequency (RF) transmitter (controlled device 49) may be powered to transmit a burst of data, when another microprocessor (not shown) detects a polling query from some remote location and provides a signal 41 to the logic controller 37. There is really no limit to the different kinds of such controlled devices 49 and associated inputs 41 to which the power supply 20 of this invention can be applied.

There can be, however, situations in which the load subsystem 30' shown in FIG. 5 can become unstable. For example, if the energy storage capacitor 87 is initially dead or is drained to a very discharged state, such as if the energy storage device 22 becomes discharged below the minimum threshold voltage level required for the voltage sensor 32 to keep the energy converter 28 activated and the energy storage capacitor 87 has to power the controlled device 49 through a number of events without any recharge energy, it puts a heavy load on the energy converter 28 when the energy converter 28 is reactivated, even with the current limiting resistor 39. Such heavy load can pull down the otherwise constant voltage output of the energy converter 28 on node 40 to something less than the minimum voltage required to operate the logic controller 37, so the logic controller 37 will turn itself off. For example, the logic controller 37 may require a minimum of 4.5 V to operate. If the heavy load of a discharged energy storage capacitor 87 pulls the voltage on node 40 down below 4.5 V, the logic controller 37 will turn itself off. Then, without the current draw of the logic controller 37, the voltage on node 40 jumps back above 4.5 V, and the logic controller 37 turns itself back on. Then, the turned-on logic controller 37 in combination with the heavy load of the discharged energy storage capacitor 87 immediately pulls the voltage on node 40 below 4.5 V again, thus causing the logic controller 37 to turn off again, and the cycle continues, i.e., to logic controller 37 flashes on and off repeatedly. A larger current limiting resistor 39 could alleviate such flashing problem, but it would also make recharge of the energy storage capacitor 87 very slow. Thus, the dead or very discharged energy storage capacitor 87 in the load subsystem 30' can destabilize the load subsystem 30' circuit in the FIG. 5 embodiment of the power source 20.

Another embodiment of the power supply 20, shown in FIGS. 6 and 7, however, is particularly well-suited to enhancing initial "dead" battery charging and power start-up of low powered instrumentation or equipment using a small energy storage device 22 and a small energy recharge source 24, according to this invention, but without the destabilizing effect of a dead or very discharged energy storage capacitor 87 on the load subsystem 30", in contrast to such destabilizing effect on the load subsystem 30' of the FIG. 5 embodiment described above. In this FIGS. 6 and 7 embodiment, the energy storage capacitor 87 is still recharged with energy from energy converter 28, but the recharging current flows through the logic controller 37, instead of directly from node 40, as was the case in the FIG. 5 embodiment described above. This configuration of the load subsystem 30" in FIGS. 6 and 7 further isolates the energy storage capacitor 87 recharge load currents from the power supply sub-system 10" and node 40 and permits selective application of the recharge current to the energy storage capacitor 87 by the logic controller 37 only when there is sufficient voltage on node 40 to operate the logic controller 37. This change eliminates the destabilizing flashing on and off of the logic controller 37, as was described above for the FIG. 5 embodiment. For example, during initial "dead" battery charging of energy storage source 22, energy converter 28 is kept turned off by sensor 32 via node 44, maintaining a zero voltage status on node 40, thus also on the logic controller 37. With no voltage on node 40, the logic controller 37 remains off. Since the recharge current in the load subsystem 30" of FIGS. 5 and 6 has to be provided to energy storage capacitor 87 by logic controller 37 via node 43, there is no power drain from the energy storage device 22 to switch controller 48 or controlled device 49 to drain or impede the initial start-up charging of the energy storage device 22 by the energy recharge source 24. Once the energy storage device 22 reaches a minimum charge voltage sufficient for sensor 32 to turn on energy converter 28 which, in turn, supplies regulated 5.0 V dc power to logic controller 37 via node 40, logic controller 37 may be configured or programmed to provide energy to recharge the energy storage capacitor 87 only when and at a rate that does not destabilize the load subsystem 30" circuit, or even to maintain, indefinitely if required, a zero charge current to energy storage capacitor 87, thus providing complete control over when energy storage capacitor 87 is charged or readied for a subsequent switching event of controlled device 49. Both the charging current to energy storage capacitor 87 via node 43 and the on/off control of switch controller 48 via node 88 are determined solely by the logic configuration or programming of logic controller 37.

Typically, logic devices and microcomputers are not considered as appropriate current sources for charging large capacitive loads, such as the energy storage capacitor 87, and may raise concerns as to the practical application of the configuration presented in FIGS. 6 and 7. For example, logic devices are normally limited to sourcing a maximum current of 25 mA (0.025 amperes) and are primarily intended as high-speed voltage switching devices. However, this problem can be resolved by either paralleling several logic gates 92 or devices to achieve the desired recharge rate, as shown in FIG. 7, and/or by placing current limiting resistor(s) 93 in line with node 43, as also illustrated in FIG. 7. Using the previous example of a single switching event of controlled device 49 requiring a 1.47 A current pulse for 0.045 seconds, the charge Q taken from the energy storage capacitor 87 is:

$$Q=(I)\times(t)=0.066 \text{ coulombs},$$

or $$Q=0.065 \text{ ampere-seconds}$$

To replace the charge taken from the energy storage capacitor 87 using this example, a charge rate of 0.025 A (25 mA) from logic controller 37 via node 92 would take:

$$t=(Q)/(I)=(0.066 \text{ ampere-seconds})/(0.025A)=2.6 \text{ seconds},$$

using a single logic gate or device output as a charging source for energy storage capacitor 87 via node 43 without an current limiting resistor 93 required. Thus, a logic device 37 can be used effectively as a programmable, controlled source of charging current for energy storage capacitor 87 in the desired applications of the power supply 20 of this invention. The current required to replace the charge on energy storage capacitor 87 due to a single switching discharge event is averaged over the time period between successive switching events, thus significantly reducing the current load on the recharge source.

The energy recharge source 24 used in the preferred embodiment of the invention can be, for example, an internal solar panel rated at 5.5 V dc at 55 mA, as described above. A slightly upgraded solar panel with a 70 mA and 7.0 V dc rating has also been used successfully for the energy recharge source 24 in the power supply 20 of this invention.

The logic controller 37 used in the preferred embodiment of the invention is a Motorola MC68HC711E9CFN2, single chip, 8-Bit microcontroller; however, any generic configuration of a logic controller device will suffice, including an arrangement of discrete logic devices such as AND, NAND, OR, NOR or Flip-Flop gates.

If the controlled device 49 comprises a single load, a PNP-type switch controller 87, such as a part. no. TPS2015 power distribution switch, manufactured by Texas Instruments, of Dallas, Tex., can be used. However, if the controlled device 49 comprises multiple loads, such as the two-coil, latching solenoid 82 in FIG. 7 (one coil for opening a valve with spring assist and a second coil for closing the valve against the spring bias), a dual-PNP transistor package, such as a part no. FDR8308P, manufactured by Fairchild Semiconductor Corp., of Irving, Tex., would work for the switch controller 48.

Figure 8:
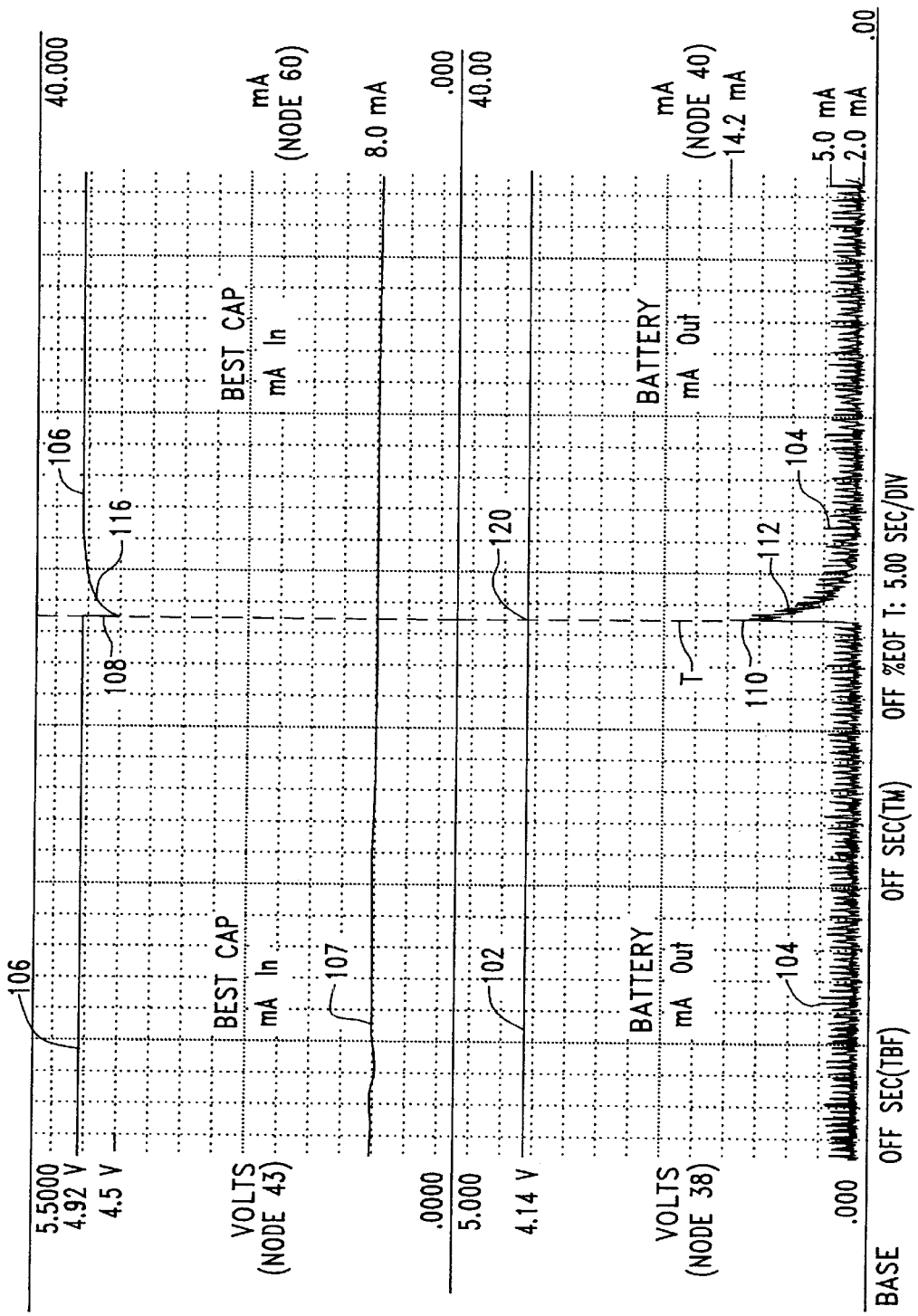

Referring now primarily to FIG. 8 in combination with FIG. 7, the circuit performance of several key nodes 38, 40, 43, and 60 illustrate the effectiveness with which the design of the power supply 20 of FIGS. 6 and 7 optimize utilization and performance of key components as the example latch solenoid 82 of controlled device 49 is switched to an "on" position to open a solenoid valve (not shown), including: (i) rechargeable battery 52 of energy storage device 22; (ii) super capacitor 91 of energy storage capacitor 87; and (iii) a solar panel of energy recharge source 24. As mentioned above, in the example of the solenoid 82 in FIG. 7, a spring assist feature helps the solenoid 82 to the "open" valve position, so less energy is required for that event than for moving the valve against the spring bias to the "closed" valve position, which will be illustrated below.

In FIG. 8 (with continuing reference also to FIG. 7 for component identifications), prior to the switch event, the voltage 102 of the rechargeable battery 52 of energy storage device 22 on node 38 is at a constant 4.14 volts, while the current draw 104 of the load subsystem 30" fluctuates between about 2.0 to 5.0 mA at node 40, mostly due to the logic controller 37 waking up at one second intervals to process programmed control signal and timing functions. At the same time, the voltage 106 of the super capacitor 91 (called BestCap™) of the energy storage capacitor 87 is maintained at about 4.92 V on node 43 by the logic controller 37. The current output 107 of the solar panel of the energy recharge source 24 at node 60 is shown to be about 8.0 mA, which, of course is dependent on the intensity of the sunlight on the solar panel at that particular time.

The high current pulse of the switch event at time T occurs when the logic controller 37 signals the switch controller 48 to power the solenoid 82 of the controlled device 49 to turn on the solenoid valve (not shown). This switch event at time T causes the super capacitor 91 to discharge current in a pulse of about 0.75 amps for about 40 milliseconds (not shown on FIG. 8). This high current discharge at time T causes an abrupt voltage drop 108 in the super capacitor 91 voltage on node 43 from its pervious level of 4.92 volts to about 4.5 volts, as shown in FIG. 8. At the same time T, there is a corresponding current spike 110 at node 40 to about 14.2 milliamps, as the logic controller 37 draws on energy from the energy converter 28 to begin recharging the super capacitor 91. Then, as shown as 112 on FIG. 8, the current draw at node 40 gradually decreases back to its previous steady state current level 104 of about 2.0 to 5.0 mA as the voltage 116 of the super capacitor on node 43 builds back up to a steady state voltage 118 at its previous level 106 of about 4.92 volts.

A significant illustration of this chart in FIG. 8 is that the voltage level 120 of the rechargeable battery 52 shows virtually no load response to the high current switching event as its voltage level 120 remains virtually unchanged at time T. In other words, as the super capacitor 91 discharges the high current pulse to the solenoid 82 of the controlled device 49, and immediately thereafter, when the super capacitor 91 is being recharged with current 112 flowing through node 40 from the energy converter 28, the voltage level 120 of the rechargeable battery of the energy storage device 22 remains virtually unchanged at 4.14 volts. Of course, this unchanged voltage level 120 of 4.14 volts on node 38 results in no change in the 8.0 mA current production level 107 from the solar panel of the energy recharge source 24 at node 60, assuming that there is no change in intensity of the sunlight incident on the solar panel at that time T. This very steady voltage level 120 of the rechargeable battery 52, with virtually no change as the super capacitor 91 powers the momentary, high current load of the controlled device 49, demonstrates how effectively the power supply 20 configuration of FIGS. 6 and 7 isolates the energy storage device 22 of the power subsystem 10" from the pulsed, high-current function of the controlled device 49 of the load subsystem 30". This isolation virtually eliminates the voltage fluctuations of the rechargeable battery 52, the extreme temperature effects on the rechargeable battery 52, and the charge status of the rechargeable battery 52 from affecting the control and operation of the controlled device 49 by the power supply 20.

Figure 9:
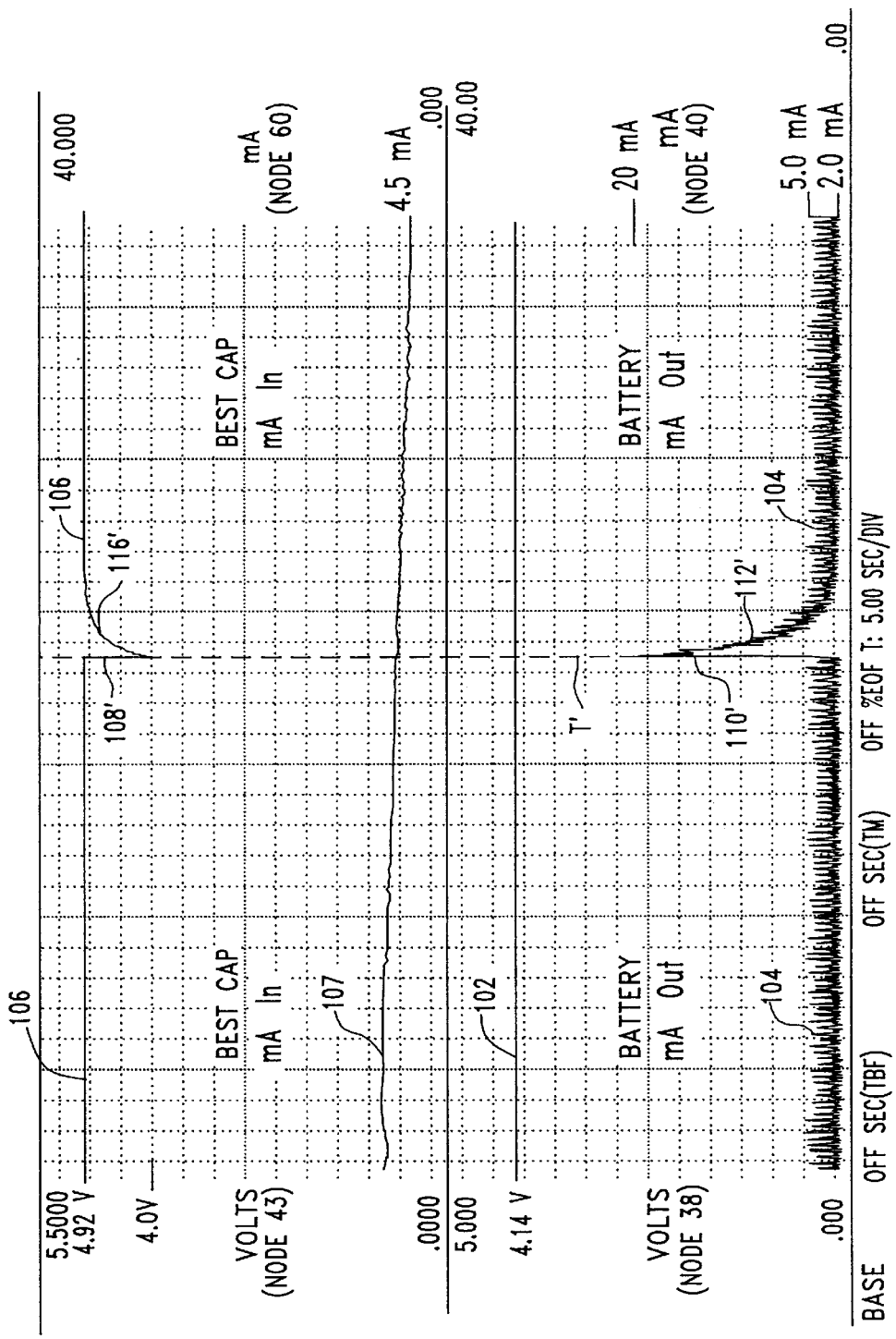
FIG. 9 is a data print-out showing example characteristics of the power supply and high current switching apparatus when the solenoid valve controlled device is turned off.

The circuit response of the power supply 20 of FIG. 7 during the switch "off" event, where a higher capacitor 91 discharge—a 1.25 ampere pulse—for 45 milliseconds is needed to power the latching solenoid 82 against the above-described spring bias of the example controlled device 49, is illustrated in FIG. 9. This high current switching event at time T' causes an abrupt drop 108' in capacitor 91 voltage level 106 from the steady state voltage level 106 of 4.92 volts down to about 4.0 volts on node 42, whereupon the normal 2.0 to 5.0 mA current draw 104 from energy converter 28 via node 40 spikes up at 110' to about 20 mA as recharge of the capacitor 91 begins. Again, the voltage level 102 of the rechargeable battery 52 remains virtually unaffected at 4.14 volts on node 38 during the voltage drop 108' on node 43 and the resulting current spike 110' in node 40, and it remains unchanged during the gradual build-up 116' of capacitor 91 to the previous voltage level 106 of 4.92 volts, which illustrates the isolation of the energy storage device 22 from the controlled device 49 according to this invention. Also, the recharge of capacitor 91 occurs over a relatively short time period—about 7 to 9 seconds, which illustrates the responsiveness of the power supply 20 in operating the controlled device with its small capacity energy storage device 22 and energy recharge source 24. It is interesting to note that the current output level 107' of the energy recharge source 24 solar panel varied from about 6.5 mA down to about 4.5 mA during the 155 seconds charted in FIG. 9, which is indicative of loss of sunlight intensity, such as due to a cloud moving between the sun and the solar panel. In any event, the chart in FIG. 9 demonstrates again the quick recovery of charge in the capacitor 91 by the power supply 20 in less than 10 seconds with virtually no drawdown of the voltage of the rechargeable battery 52, even as the energy output of the energy recharge source 24 varies. This example also demonstrates that the power supply 20 is not only self-startable initially and self-restartable from a dead or very discharged condition with no help from an outside, large capacity power source, but that it is also stable, reliable, and able to recharge and repeat the example high-current pulsed events in as little as 10 seconds.

Since these and numerous other modifications and combinations of the above-described method and embodiments will readily occur to those skilled in the art, it is not desired to limit the invention to the exact construction and process shown and described above. For example, Accordingly, resort may be made to all suitable modifications and equivalents that fall within the scope of the invention as defined by the claims which follow. The words "comprise," "comprises," "comprising," "include," "including," and "includes" when used in this specification and in the following claims are intended to specify the presence of stated features or steps, but they do not preclude the presence or addition of one or more other features, steps, or groups thereof.

The embodiments of the invention in which an exclusive property or privilege is claimed are defined as follows:

1. Power supply apparatus for operating a controlled device with a sequence of momentary current pulses, comprising:
    an energy converter connected via a first node to an energy storage device, said energy converter being capable of converting energy at varying voltage levels from the energy storage device to energy at a constant output voltage on a second node; and
    an energy storage capacitor connected to the second node and connected via a switch controller to the controlled device, said switch controller being responsive to signals from a logic controller, which is connected to the second node, to discharge pulses of energy from the energy storage capacitor to the controlled device.

2. The power supply apparatus of claim 1, wherein the energy storage capacitor is connected to the second node via a current limiting resistor.

3. The power supply apparatus of claim 1, wherein the energy storage capacitor is connected to the second node via the logic controller.

4. The power supply apparatus of claim 1 wherein the energy storage capacitor comprises a capacitive component that has capacitance at least as high as 13,000 microfarads in a range of 4.5 to 5.5 volts and equivalent series resistance (ESR) of less than 1.0 ohm.

5. The power supply apparatus of claim 4, wherein the capacitive component has an ESR of less than 0.5 ohm.

6. The power supply apparatus of claim 5, wherein the capacitive component has an ESR of about 0.2 ohm.

7. The power supply apparatus of claim 1, wherein the energy converter operates with energy conversion efficiency that varies in relation to voltage on the first node and is responsive to a voltage sensor, which is connected to sense voltage on the first node, to output energy on the second node only when voltage on the first node is in a range in which the energy converter operates with at least a minimum desired energy conversion efficiency.

8. The power supply apparatus of claim 7, wherein the minimum desired energy conversion efficiency is at least fifty percent.

9. The power supply apparatus of claim 7, wherein the minimum desired energy conversion efficiency is at least seventy percent.

10. The power supply apparatus of claim 1, including an energy recharge source connected to the first node.

11. The power supply apparatus of claim 1, wherein the energy storage device includes a rechargeable battery.

12. The power supply apparatus of claim 10, wherein the energy recharge source includes a solar panel.

13. Power supply apparatus for operating a controlled device with a sequence of energy pulses, comprising:
    an energy storage device comprising a rechargeable battery with a capability of receiving and providing electric energy at varying voltages, said rechargeable battery being connected to a first node;
    an energy recharge source connected to the first node;
    an energy converter connected to the first node, said energy converter being capable, when activated, of converting energy of varying voltages from the first node, to a constant voltage energy output on a second node with an energy conversion efficiency that varies with voltage on the first node, and said energy converter being responsive to a voltage sensor, which is connected to the first node, to convert energy from the first node to the constant voltage energy on the second node only when the voltage sensor senses voltage on the first node at which the energy converter can convert energy with at least a desired energy conversion efficiency to the constant voltage energy output on the second node; and
    an energy storage capacitor connectable by a switch controller to the controlled device, the switch controller being responsive to a logic controller to connect the energy storage capacitor to the controlled device in a manner that discharges pulses of energy from the energy storage capacitor to the controlled device, said logic controller being connected to the second node and to the energy storage capacitor and being gated and actuateable to deliver energy from the second load to charge and recharge the energy storage capacitor.

14. A charging apparatus, comprising:
    a solar power source connected to a node, said solar power source having a capacity to produce electric energy at varying voltage and current output levels depending on available sunlight;
    a rechargeable battery connected to said node, said rechargeable battery being capable of receiving and storing electric energy from said solar power source via said node at varying voltage levels and of delivering stored electric energy to said node at varying voltage levels;
    an energy converter that has an input terminal connected to said node and an output terminal that is connectable to a load, said energy converter being actuateable in response to a first control signal to convert electric energy of varying voltage from said node to electric energy of a constant voltage level at said output terminal for powering said load, and said energy converter having varying energy conversion efficiency levels that vary as a function of the varying voltage levels at said node, there being a minimum threshold voltage level at said node that corresponds with a minimum desired energy conversion efficiency level at which the solar power source can deliver energy to the load and supply energy to the rechargeable battery;

a voltage detector connected to said node and having a capability of providing said first control signal to said energy converter in response to detection of voltage at said node that is equal to or greater than said minimum threshold voltage level; and a load connected to said output terminal of said energy converter, said load further comprising:

a logic controller, said logic controller being programable to deliver electric current supplied by said energy converter, and further being capable of sending a second control signal;

a switch controller, said switch controller being capable of accepting a short period, high electrical current pulse, and further being capable of delivering said short period, high electrical current pulse to a controlled device; and an energy storage capacitor, said energy storage capacitor being capable of storing electric current delivered by said logic controller, and further being capable of receiving said second control signal from said logic controller, and upon receiving said second control signal, being capable of delivering multiple iterations of said short period, high electrical current pulse to said switch controller without a need to recharge between deliveries.

15. The solar power supply system of claim 14, wherein said short period, high electrical current pulse has a duration ranging from ten to several hundred milliseconds.

16. The solar power supply system of claim 15, wherein said short period, high electrical current pulse is supplied at a current of at least one ampere for the duration of the pulse.

17. The solar power supply system of claim 14, wherein said energy storage capacitor is capable of delivering at least four of said short period, high electrical current pulses without a need to recharge between deliveries.

18. The solar power supply system of claim 17, wherein said storage energy capacitor provides capacitance values ranging from 0.013 to 0.06 farads.

19. The solar power supply system of claim 18, wherein said storage energy capacitor has an equivalent series resistence rating ranging from 1 to 200 milliohms.

20. The solar power supply system of claim 19, wherein said storage energy capacitor carries a voltage of at least 4.5 volts.

21. The solar power supply system of claim 19, wherein said energy storage capacitor provides a capacitance value of 0.06 farads.

22. The solar power supply system of claim 21, wherein said energy storage capacitor has an equivalent series resistence of 0.2 ohms.

23. The solar power supply system of claim 22, wherein said energy storage capacitor carries a voltage of 5.5 volts.

24. A power supply system, comprising:

an energy recharge source connected to a node, said energy recharge source having a capacity to produce electric energy, but at varying energy output levels that can decrease to be insufficient to power a load and then increase again;

an energy device source connected to said node, said energy device source being capable of receiving and storing electric energy from said energy recharge source via said node at varying voltage levels and of delivering stored electric energy to said node at varying voltage levels;

an energy converter that has an input terminal connected to said node and an output terminal that is connectable to the load, said energy converter being actuateable in response to a first control signal to convert electric energy of varying voltages from said node to electric energy of a constant voltage level at said outlet terminal for powering the load, and said energy converter having varying energy conversion efficiency levels that vary as a function of the varying voltage levels at said node, there being a minimum threshold voltage level at said node that corresponds with a minimum desired energy conversion efficiency level at which the energy recharge source can deliver energy to the load and supply energy to the energy storage source to recharge the energy storage source;

a voltage detector connected to said node and having the capability of providing said control signal to said energy converter in response to detection of voltage that is equal to or greater than said minimum threshold voltage level; and a load connected to said output terminal of said energy converter, said load further comprising:

a logic controller, said logic controller being programable to deliver electric current supplied by said energy converter, and further being capable of sending a second control signal;

a switch controller, said switch controller being capable of accepting a short period, high electrical current pulse, and further being capable of delivering said short period, high electrical current pulse to a controlled device; and an energy storage capacitor, said energy storage capacitor being capable of storing electric current delivered by said logic controller, and further being capable of receiving said second control signal from said logic controller, and upon receiving said second control signal, being capable of delivering multiple iterations of said short period, high electrical current pulse to said switch controller without a need to recharge between deliveries.

25. The power supply system of claim 24, wherein said energy recharge source comprises a solar cell, panel, or array, and said varying energy output levels vary as a function of sunlight intensity incident on said solar cell, panel, or array.

26. The power supply system of claim 24, wherein said energy storage capacitor is capable of delivering said short period, high electrical current pulse of at least one ampere for a time of at least ten milliseconds at least two times without a need to recharge between deliveries.

27. The power supply system of claim 25, wherein said energy storage capacitor has a minimum capacitance value of 0.06 farads, a maximum equivalent series resistence of 0.2 ohms, and a voltage of 5.5 volts.

28. A method of switching short period high electrical current pulses that comprises a solar power source, a rechargeable energy storage source, a DC—DC voltage converter with its input connected at a common node to both the solar power source and the rechargeable energy storage source, and its output connected to a load comprising a logic controller, a switch controller, and an energy storage capacitor, said method comprising:

exposing the solar power source to light energy to produce electric energy to said node while keeping said DC—DC voltage converter deactuated so that all of the electric energy produced by the solar power source flows into said rechargeable energy storage source and none of the electric energy flows to the load in order to build up voltage of said rechargeable energy storage source at said common node;

monitoring voltage of said rechargeable energy storage source at said common node and, when the voltage of the rechargeable energy storage source rises to a minimum voltage threshold that corresponds to a minimum desired energy conversion efficiency capability of said DC—DC voltage converter, then actuating said DC—DC voltage converter to convert and deliver at least some of the electric energy available at said common node to said logic controller with said DC—DC voltage converter operating at or above said minimum desired energy conversion efficiency;

delivering at least some of the electric energy available from said logic controller according to a programmed set of instructions to said energy storage capacitor in order to build up voltage of said energy storage capacitor;

sending a signal from said logic controller to said energy storage capacitor triggering the release and delivery of at least some of the electric energy available from said energy storage capacitor to said switch controller utilizing the delivered electric energy from the energy storage capacitor to actuate said switch controller, which in turn, switches a controlled device from either an off to an on position or from an on to an off position; and repeating the process, whereby said logic controller sends a signal to said energy storage capacitor, triggering the release and delivery of at least some additional amount of the electric energy available from said energy storage capacitor to said switch controller, whereby said switch controller is actuated to switch said controlled device from either an off to an on position or from an on to an off position.

29. The method of claim 28, whereby the minimum number of switching operations before said energy storage capacitor requires recharging is four.

30. A method of providing power pulses to a controlled device, comprising:

providing energy from a rechargeable battery to a DC—DC voltage converter and converting such energy to a constant voltage energy output only when the energy from the rechargeable battery is high enough for the DC—DC voltage converter to operate at or above a minimum desired energy conversion efficiency;

charging an energy storage capacitor with energy from the DC—DC voltage converter;

discharging energy from the energy storage capacitor in a sequence of pulses to the controlled device;

recharging the energy storage device with energy from the DC—DC voltage converter after discharging a pulse of energy from the energy storage capacitor to the controlled device; and recharging the rechargeable battery with energy from an energy recharge source.

31. The method of claim 30, including recharging the rechargeable battery with energy from a solar panel that functions as the energy recharge source.

32. The method of claim 30, including controlling beginning and ending of the pulses of energy discharged from the energy storage capacitor with a switch controller interposed between the energy storage capacitor and the controlled device in response to signals from a logic controller that is power with energy that is output by the DC—DC voltage converter.

* * * * *